(12) United States Patent
Takagi et al.

(10) Patent No.: US 10,177,971 B2
(45) Date of Patent: Jan. 8, 2019

(54) OPERATION MANAGEMENT DEVICE AND METHOD

(71) Applicant: FUJITSU LIMITED, Kawasaki-shi, Kanagawa (JP)

(72) Inventors: Hiroyuki Takagi, Yokohama (JP); Naohiro Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 419 days.

(21) Appl. No.: 14/625,833

(22) Filed: Feb. 19, 2015

(65) Prior Publication Data

US 2015/0163092 A1    Jun. 11, 2015

Related U.S. Application Data

(63) Continuation of application No. PCT/JP2012/072071, filed on Aug. 30, 2012.

(51) Int. Cl.
*H04L 29/08* (2006.01)
*H04L 12/26* (2006.01)
(Continued)

(52) U.S. Cl.
CPC ............ *H04L 41/08* (2013.01); *G06F 9/5077* (2013.01); *H04L 41/00* (2013.01); *H04L 67/10* (2013.01);
(Continued)

(58) Field of Classification Search
None
See application file for complete search history.

(56) References Cited

U.S. PATENT DOCUMENTS

| | | | |
|---|---|---|---|
| 2005/0120088 A1* | 6/2005 | Liu | H04L 41/12 709/213 |
| 2006/0085785 A1* | 4/2006 | Garrett | G06F 9/5061 718/1 |

(Continued)

FOREIGN PATENT DOCUMENTS

| | | |
|---|---|---|
| JP | 2007-257097 | 10/2007 |
| JP | 2008-517382 | 5/2008 |

(Continued)

OTHER PUBLICATIONS

Patent Abstracts of Japan, Publication No. 2009-532944, published Sep. 10, 2009.

(Continued)

*Primary Examiner* — Philip J Chea
*Assistant Examiner* — Hassan A Khan
(74) *Attorney, Agent, or Firm* — Staas & Halsey LLP

(57) ABSTRACT

An operation management device includes a processor that executes a procedure including: for plural nodes that includes plural nodes operating as virtual computers on one or more computers and that plural nodes that have a dependency relationship, deriving group information indicating the plural nodes having the dependency relationship on a basis of communication information from when the inter-node communication; and based on location information of the respective plural nodes included in the derived group information, determining operation information indicating that plural nodes included in the group information operate on a single computer, or operation information indicating that the plural nodes included in the group information respectively operate on plural computers, for the plural nodes included in the group information.

17 Claims, 28 Drawing Sheets

SIMILARITY GROUP TABLE     TB2

| VIRTUAL SERVER | IP ADDRESS | SIMILARITY GROUP | CURRENT LOCATION |
|---|---|---|---|
| VIRTUAL SERVER SV1 | 192.xx.xx.xx | X-1 | PHYSICAL SERVER A |
| VIRTUAL SERVER SV2 | 192.xx.xx.xx | X-2 | PHYSICAL SERVER B |
| VIRTUAL SERVER SV3 | 192.xx.xx.xx | X-3 | PHYSICAL SERVER C |
| VIRTUAL SERVER SV4 | 192.xx.xx.xx | Y-1 | PHYSICAL SERVER A |
| VIRTUAL SERVER SV5 | 192.xx.xx.xx | Y-2 | PHYSICAL SERVER A |
| VIRTUAL SERVER SV6 | 192.xx.xx.xx | Y-3 | PHYSICAL SERVER A |

(51) Int. Cl.
*G06F 9/50* (2006.01)
*H04L 12/24* (2006.01)

(52) U.S. Cl.
CPC ...... *H04L 41/0893* (2013.01); *H04L 43/0817* (2013.01)

(56) References Cited

U.S. PATENT DOCUMENTS

| | | | | |
|---|---|---|---|---|
| 2007/0226449 | A1* | 9/2007 | Akimoto | G06F 9/5077 711/170 |
| 2007/0239987 | A1* | 10/2007 | Hoole | H04L 63/102 713/169 |
| 2008/0235373 | A1* | 9/2008 | Haley | H04L 43/0817 709/224 |
| 2012/0110089 | A1* | 5/2012 | Wang | H04L 45/00 709/205 |
| 2012/0185422 | A1* | 7/2012 | Shah | G06F 17/30495 706/47 |
| 2012/0226808 | A1* | 9/2012 | Morgan | G06F 9/5072 709/226 |

FOREIGN PATENT DOCUMENTS

| | | |
|---|---|---|
| JP | 2009-199395 | 9/2009 |
| JP | 2009-532944 | 9/2009 |
| JP | 2010-176178 | 8/2010 |
| JP | 2011-186775 | 9/2011 |

OTHER PUBLICATIONS

Patent Abstracts of Japan, Publication No. 2011-186775, published Sep. 22, 2011.
Patent Abstracts of Japan, Publication No, 2008-517382, published May 22, 2008.
Patent Abstracts of Japan, Publication No. 2009-199395, published Sep. 3, 2009.
Patent Abstracts of Japan, Publication No. 2007-257097, published Oct. 4, 2007.
Patent Abstracts of Japan, Publication No. 2010-176178, published Aug. 12, 2010.
Written Opinion of the International Searching Authority dated Dec. 4, 2012 in corresponding International Application No. PCT/JP2012/072071.
International Search Report dated Dec. 4, 2012 in corresponding International Patent Application No. PCT/JP2012/072071.

* cited by examiner

FIG.4

PHYSICAL SERVER MANAGEMENT TABLE 68

| PHYSICAL SERVER ID | PHYSICAL SERVER NAME | IP ADDRESS | AVAILABLE PROCESSOR CAPACITY (MHz) | AVAILABLE MEMORY CAPACITY (MB) |
|---|---|---|---|---|
| 1 | PHYSICAL SERVER A | 192.168.1.ZZ | 2000 | 8000 |
| 2 | PHYSICAL SERVER B | 192.168.1.AA | 2500 | 8000 |
| ⋮ | ⋮ | ⋮ | ⋮ | ⋮ |

FIG.5

VIRTUAL SERVER MANAGEMENT TABLE                                        66

| VIRTUAL SERVER ID | VIRTUAL SERVER NAME | IP ADDRESS | AVAILABLE PROCESSOR CAPACITY (MHz) | AVAILABLE MEMORY CAPACITY (MB) | LOCATION |
|---|---|---|---|---|---|
| 1 | VIRTUAL SERVER SV1 | 192.168.1.XX | 500 | 1500 | PHYSICAL SERVER A |
| 2 | VIRTUAL SERVER SV2 | 192.168.1.YY | 300 | 2000 | PHYSICAL SERVER B |
| ⋮ | ⋮ | ⋮ | ⋮ | ⋮ | ⋮ |

FIG.6

VIRTUAL SERVER COMMUNICATION HISTORY TABLE                             70

| TIMING | TRANSMISSION ORIGIN IP | PORT NUMBER | RECEPTION DESTINATION IP | PORT NUMBER | COMMUNICATION VOLUME (KB) |
|---|---|---|---|---|---|
| xx:xx:xx | 192.xx.xx.xx | 80 | 192.xx.xx.yy | 80 | 30 |
| xx:xx:yy | 192.xx.xx.yy | 80 | 192.xx.xx.xx | 80 | 80 |
| ⋮ | ⋮ | ⋮ | ⋮ | ⋮ | ⋮ |

FIG.8

CONFIGURATION GROUP TABLE                                              TB1

| CONFIGURATION GROUP | SIMILARITY GROUP | ASSIGNED VIRTUAL SERVERS | LOCATION | RUNNING CONFIGURATION |
|---|---|---|---|---|
| X | X-1 | VIRTUAL SERVER SV1 (web) | PHYSICAL SERVER A | DISTRIBUTION CONFIGURATION |
|   | X-2 | VIRTUAL SERVER SV2 (app) | PHYSICAL SERVER B |   |
|   | X-3 | VIRTUAL SERVER SV3 (DB) | PHYSICAL SERVER C |   |
| Y | Y-1 | VIRTUAL SERVER SV4 (web) | PHYSICAL SERVER A | CONCENTRAION CONFIGURATION |
|   | Y-2 | VIRTUAL SERVER SV5 (app) | PHYSICAL SERVER A |   |
|   | Y-3 | VIRTUAL SERVER SV6 (DB) | PHYSICAL SERVER A |   |

SIMILARITY GROUP TABLE

| VIRTUAL SERVER | IP ADDRESS | SIMILARITY GROUP | CURRENT LOCATION |
|---|---|---|---|
| VIRTUAL SERVER SV1 | 192.xx.xx.xx | X-1 | PHYSICAL SERVER A |
| VIRTUAL SERVER SV2 | 192.xx.xx.xx | X-2 | PHYSICAL SERVER B |
| VIRTUAL SERVER SV3 | 192.xx.xx.xx | X-3 | PHYSICAL SERVER C |
| VIRTUAL SERVER SV4 | 192.xx.xx.xx | Y-1 | PHYSICAL SERVER A |
| VIRTUAL SERVER SV5 | 192.xx.xx.xx | Y-2 | PHYSICAL SERVER A |
| VIRTUAL SERVER SV6 | 192.xx.xx.xx | Y-3 | PHYSICAL SERVER A |

INTER-SERVER COMMUNICATION EVENT COUNT TABLE — TB3

| | VIRTUAL SERVER SV1 | VIRTUAL SERVER SV2 | VIRTUAL SERVER SV3 | VIRTUAL SERVER SV4 | VIRTUAL SERVER SV5 | VIRTUAL SERVER SV6 | EXTERNAL SECTION 1 | EXTERNAL SECTION 2 |
|---|---|---|---|---|---|---|---|---|
| VIRTUAL SERVER SV1 | | 10 | 0 | 0 | 0 | 0 | 10 | 0 |
| VIRTUAL SERVER SV2 | 10 | | 8 | 0 | 0 | 0 | 0 | 0 |
| VIRTUAL SERVER SV3 | 0 | 8 | | 0 | 0 | 0 | 0 | 0 |
| VIRTUAL SERVER SV4 | 0 | 0 | 0 | | 9 | 0 | 0 | 10 |
| VIRTUAL SERVER SV5 | 0 | 0 | 0 | 9 | | 8 | 0 | 0 |
| VIRTUAL SERVER SV6 | 0 | 0 | 0 | 0 | 8 | | 0 | 0 |
| EXTERNAL SECTION 1 | 10 | 0 | 0 | 0 | 0 | 0 | | 0 |
| EXTERNAL SECTION 2 | 0 | 0 | 0 | 10 | 0 | 0 | 0 | |

FIG.11

INTER-SERVER DISTANCE TABLE TB4

| | VIRTUAL SERVER SV1 | VIRTUAL SERVER SV2 | VIRTUAL SERVER SV3 | VIRTUAL SERVER SV4 | VIRTUAL SERVER SV5 | VIRTUAL SERVER SV6 |
|---|---|---|---|---|---|---|
| VIRTUAL SERVER SV1 | | 21 | 10 | 12 | 21 | 19 |
| VIRTUAL SERVER SV2 | | | 18 | 18 | 17 | 14 |
| VIRTUAL SERVER SV3 | | | | 19 | 17 | 13 |
| VIRTUAL SERVER SV4 | | | | | 18 | 10 |
| VIRTUAL SERVER SV5 | | | | | | 15 |
| VIRTUAL SERVER SV6 | | | | | | |

FIG.15

CONFIGURATION GROUP TABLE  TB1-1

| CONFIGURATION GROUP | ASSIGNED VIRTUAL SERVERS | LOCATION |
|---|---|---|
| X | VIRTUAL SERVER SV1 | PHYSICAL SERVER A |
| | VIRTUAL SERVER SV2 | PHYSICAL SERVER B |
| | VIRTUAL SERVER SV3 | PHYSICAL SERVER C |
| Y | VIRTUAL SERVER SV4 | PHYSICAL SERVER A |
| | VIRTUAL SERVER SV5 | PHYSICAL SERVER A |
| | VIRTUAL SERVER SV6 | PHYSICAL SERVER A |

FIG.16

CONFIGURATION GROUP TABLE                                    TB1-2

| CONFIGURATION GROUP | SIMILARITY GROUP | ASSIGNED VIRTUAL SERVERS | LOCATION | RUNNING CONFIGURATION |
|---|---|---|---|---|
| X | X-1 | VIRTUAL SERVER SV1 | PHYSICAL SERVER A | DISTRIBUTION CONFIGURATION |
| | X-2 | VIRTUAL SERVER SV2 | PHYSICAL SERVER B | |
| | X-3 | VIRTUAL SERVER SV3 | PHYSICAL SERVER C | |
| Y | Y-1 | VIRTUAL SERVER SV4 | PHYSICAL SERVER A | CONCENTRATION CONFIGURATION |
| | Y-2 | VIRTUAL SERVER SV5 | PHYSICAL SERVER A | |
| | Y-3 | VIRTUAL SERVER SV5 | PHYSICAL SERVER A | |

FIG.19
INTER-SERVER COMMUNICATION EVENT COUNT TABLE

TB3

|  | VIRTUAL SERVER SV1 | VIRTUAL SERVER SV2 | VIRTUAL SERVER SV3 | VIRTUAL SERVER SV4 | VIRTUAL SERVER SV5 | VIRTUAL SERVER SV6 | VIRTUAL SERVER SV7 | VIRTUAL SERVER SV8 | VIRTUAL SERVER SV9 | EXTERNAL SECTION 1 | EXTERNAL SECTION 2 |
|---|---|---|---|---|---|---|---|---|---|---|---|
| VIRTUAL SERVER SV1 | ＼ | 10 | 0 | 0 | 0 | 0 | 0 | 0 | 0 | 10 | 0 |
| VIRTUAL SERVER SV2 | 10 | ＼ | 8 | 0 | 0 | 0 | 0 | 8 | 0 | 0 | 0 |
| VIRTUAL SERVER SV3 | 0 | 8 | ＼ | 0 | 0 | 8 | 0 | 0 | 0 | 0 | 0 |
| VIRTUAL SERVER SV4 | 0 | 0 | 0 | ＼ | 9 | 0 | 7 | 0 | 0 | 0 | 10 |
| VIRTUAL SERVER SV5 | 0 | 0 | 0 | 9 | ＼ | 8 | 0 | 0 | 0 | 0 | 0 |
| VIRTUAL SERVER SV6 | 0 | 0 | 8 | 0 | 8 | ＼ | 0 | 8 | 0 | 0 | 0 |
| VIRTUAL SERVER SV7 | 0 | 0 | 0 | 7 | 0 | 0 | ＼ | 0 | 0 | 0 | 0 |
| VIRTUAL SERVER SV8 | 0 | 8 | 0 | 0 | 0 | 8 | 0 | ＼ | 0 | 0 | 0 |
| VIRTUAL SERVER SV9 | 0 | 0 | 0 | 0 | 0 | 0 | 0 | 0 | ＼ | 0 | 0 |
| EXTERNAL SECTION 1 | 10 | 0 | 0 | 0 | 0 | 0 | 0 | 0 | 0 | ＼ | 0 |
| EXTERNAL SECTION 2 | 0 | 0 | 0 | 10 | 0 | 0 | 0 | 0 | 0 | 0 | ＼ |

FIG.20

INTER-SERVER DISTANCE TABLE TB4

| | VIRTUAL SERVER SV1 | VIRTUAL SERVER SV2 | VIRTUAL SERVER SV3 | VIRTUAL SERVER SV4 | VIRTUAL SERVER SV5 | VIRTUAL SERVER SV6 | VIRTUAL SERVER SV7 | VIRTUAL SERVER SV8 | VIRTUAL SERVER SV9 |
|---|---|---|---|---|---|---|---|---|---|
| VIRTUAL SERVER SV1 | | 21 | 10 | 12 | 21 | 19 | 21 | 19 | 20 |
| VIRTUAL SERVER SV2 | | | 18 | 18 | 17 | 14 | 2 | 1 | 17 |
| VIRTUAL SERVER SV3 | | | | 19 | 17 | 13 | 17 | 18 | 17 |
| VIRTUAL SERVER SV4 | | | | | 18 | 10 | 17 | 18 | 16 |
| VIRTUAL SERVER SV5 | | | | | | 15 | 15 | 17 | 1 |
| VIRTUAL SERVER SV6 | | | | | | | 14 | 16 | 14 |
| VIRTUAL SERVER SV7 | | | | | | | | 1 | 15 |
| VIRTUAL SERVER SV8 | | | | | | | | | 15 |
| VIRTUAL SERVER SV9 | | | | | | | | | |

FIG.21

CONFIGURATION GROUP TABLE

| CONFIGURATION GROUP | ASSIGNED VIRTUAL SERVERS | LOCATION |
|---|---|---|
| X | VIRTUAL SERVER SV1 | PHYSICAL SERVER A |
| | VIRTUAL SERVER SV2 | PHYSICAL SERVER B |
| | VIRTUAL SERVER SV3 | PHYSICAL SERVER C |
| | VIRTUAL SERVER SV7 | PHYSICAL SERVER A |
| | VIRTUAL SERVER SV8 | PHYSICAL SERVER C |
| Y | VIRTUAL SERVER SV4 | PHYSICAL SERVER A |
| | VIRTUAL SERVER SV5 | PHYSICAL SERVER A |
| | VIRTUAL SERVER SV6 | PHYSICAL SERVER A |
| | VIRTUAL SERVER SV9 | PHYSICAL SERVER B |

TB1

SV7 — ADDED
SV8 — ADDED
SV9 — ADDED

FIG.22

SIMILARITY GROUP TABLE ~TB2

| VIRTUAL SERVER | IP ADDRESS | SIMILARITY GROUP | CURRENT LOCATION |
|---|---|---|---|
| VIRTUAL SERVER SV1 | 192.xx.xxx.xx | X-1 | PHYSICAL SERVER A |
| VIRTUAL SERVER SV2 | 192.xx.xxx.xx | X-2 | PHYSICAL SERVER B |
| VIRTUAL SERVER SV3 | 192.xx.xxx.xx | X-3 | PHYSICAL SERVER C |
| VIRTUAL SERVER SV4 | 192.xx.xxx.xx | Y-1 | PHYSICAL SERVER A |
| VIRTUAL SERVER SV5 | 192.xx.xxx.xx | Y-2 | PHYSICAL SERVER A |
| VIRTUAL SERVER SV6 | 192.xx.xxx.xx | Y-3 | PHYSICAL SERVER A |
| VIRTUAL SERVER SV7 | 192.xx.xxx.xx | X-2 | PHYSICAL SERVER A |
| VIRTUAL SERVER SV8 | 192.xx.xxx.xx | X-2 | PHYSICAL SERVER C |
| VIRTUAL SERVER SV9 | 192.xx.xxx.xx | Y-2 | PHYSICAL SERVER B |

{ SV7, SV8, SV9 } ADDED

FIG.23

CONFIGURATION GROUP TABLE  TB1

| CONFIGURATION GROUP | SIMILARITY GROUP | ASSIGNED VIRTUAL SERVERS | LOCATION | RUNNING CONFIGURATION |
|---|---|---|---|---|
| X | X-1 | VIRTUAL SERVER SV1 (web) | PHYSICAL SERVER A | DISTRIBUTION CONFIGURATION |
| | X-2 | VIRTUAL SERVER SV2 (app) | PHYSICAL SERVER B | |
| | | VIRTUAL SERVER SV7 (app) | | |
| | | VIRTUAL SERVER SV8 (app) | | |
| | X-3 | VIRTUAL SERVER SV3 (DB) | PHYSICAL SERVER C | |
| Y | Y-1 | VIRTUAL SERVER SV4 (web) | PHYSICAL SERVER A | CONCENTRATION CONFIGURATION |
| | Y-2 | VIRTUAL SERVER SV5 (app) | PHYSICAL SERVER A | |
| | | VIRTUAL SERVER SV9 (app) | | |
| | Y-3 | VIRTUAL SERVER SV6 (DB) | PHYSICAL SERVER A | |

FIG.24

SIMILARITY GROUP TABLE  TB2

| VIRTUAL SERVER | IP ADDRESS | SIMILARITY GROUP | CURRENT LOCATION |
|---|---|---|---|
| VIRTUAL SERVER SV1 (web) | 192.xx.xx.xx | X-1 | PHYSICAL SERVER A |
| VIRTUAL SERVER SV2 (app) | 192.xx.xx.xx | X-2 | PHYSICAL SERVER B |
| VIRTUAL SERVER SV3 (DB) | 192.xx.xx.xx | X-3 | PHYSICAL SERVER C |
| VIRTUAL SERVER SV4 (web) | 192.xx.xx.xx | Y-1 | PHYSICAL SERVER A |
| VIRTUAL SERVER SV5 (app) | 192.xx.xx.xx | Y-2 | PHYSICAL SERVER A |
| VIRTUAL SERVER SV6 (DB) | 192.xx.xx.xx | Y-3 | PHYSICAL SERVER A |
| VIRTUAL SERVER SV7 (app) | 192.xx.xx.xx | X-2 | PHYSICAL SERVER B |
| VIRTUAL SERVER SV8 (app) | 192.xx.xx.xx | X-2 | PHYSICAL SERVER B |
| VIRTUAL SERVER SV9 (app) | 192.xx.xx.xx | Y-2 | PHYSICAL SERVER A |

(SV7, SV8, SV9 rows: ADDED)

OPERATION MANAGEMENT DEVICE AND METHOD

CROSS-REFERENCE TO RELATED APPLICATION

This application is a continuation application of International Application No. PCT/JP2012/072071, filed Aug. 30, 2012, the disclosure of which is incorporated herein by reference in its entirety.

FIELD

The embodiments discussed herein are related to an operation management device, an operation management method, and a recording medium storing an operation management program.

BACKGROUND

A data processing system is known that performs business processing using one or plural computers. When the business processing employs plural computers, dependency relationships sometimes exist between the computers. A relationship in which an execution result of a second computer is employed in order to perform business processing on a first computer is an example of a dependency relationship between plural computers. In a data processing system that performs business processing using plural computers, the placement of each of the plural computers is decided with consideration of countering emergencies such as power cuts, distribution of the load of processing executed by the computers, and the computer processing capacity of the computers corresponding to the business processing, and the like.

Recently, virtualization technology has been implemented that constructs plural virtual computers on a single physical computer, with objectives such as increasing the utilization efficiency of physical computers. Migration to other physical computers is possible for virtual computers constructed by virtualization technology. In recent years, data processing systems have been implemented that perform business processing using plural computers including virtual computers.

Physical computers and virtual computers need to be managed so as to achieve smooth business processing in data processing systems. Plural physical computers and virtual computers with dependency relationships are sometimes handled as groups in order to manage plural physical computers and virtual computers in the data processing system. When managing groups, namely, plural physical computers and virtual computers for which dependency relationships exist, a user considers power cut countermeasures, load distribution, processing capacity, and the like. Based on the considered power cut countermeasures, load distribution, processing capacity, and the like, the user performs management by setting operating locations indicating on which physical computer a virtual computer operates, by manual operation. For business processing using plural virtual computers, there are, for example, cases in which causing the plural virtual computers to operate on one of the physical computers is preferable, and cases in which distributing operation between separate physical computers is preferable. Therefore, sometimes there is a need to manage the operating locations of virtual computers included in groups.

As an example of a technology that manages plural computers, a technology is known that manages communications between virtual computers in which mutual communication is performed between the plural virtual computers. In the technology that manages communication between computers, communication permission between groups is managed by a policy indicating allow/disallow settings for mutual communications set in advance by a user. Groups that include plural virtual computers are defined and modified according to a user's manual operations.

A technology is also known in which plural virtual computers are grouped by a management device. In the technology in which plural virtual computers are grouped, groups are formed according to information, obtainable from the plural virtual computers, indicating the business processing performed by the virtual computers.

In an example of a technology in which a virtual computer operating on a given physical computer is caused to migrate, virtual computers are relocated according to operation states such as limitations imposed by hardware resources, or a processing load, of the physical computers on which the virtual computers operate.

A technology is also known in which, when relocating virtual computers, virtual computers are relocated while maintaining predefined group information indicating that plural virtual computers are included. In an example of a technology in which virtual computers are relocated while maintaining group information, group information predefined by a user is obtained, indicating whether plural virtual computers are to be located on different physical computers, or to be located on the same physical computer. The virtual computers are then relocated such that the group information is maintained.

RELATED PATENT DOCUMENTS

Japanese National Publication of International Patent Application No. 2009-532944
Japanese Laid-Open Patent Publication No. 2011-186775
Japanese National Publication of International Patent Application No. 2008-517382
Japanese Laid-Open Patent Publication No. 2009-199395

SUMMARY

According to an aspect of the embodiments, an operation management device includes a processor that executes a process. The process includes: for plural nodes that includes plural nodes operating as virtual computers on one or more computers and that plural nodes that have a dependency relationship and that perform mutual inter-node communication during operation, deriving group information indicating the plural nodes having the dependency relationship on a basis of communication information from when the inter-node communication is performed employing communication information that includes current locations of the nodes and that includes location information indicating current locations of one or more computers on which nodes indicated by the current locations of the nodes operate; and based on the location information of the plural respective nodes included in the derived group information, determining operation information indicating that plural nodes included in the group information operate on a single computer, or operation information indicating that the plural nodes included in the group information operate on each of plural computers, for the plural nodes included in the group information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an illustrative diagram illustrating an example of a physical server management table;

FIG. 5 is an illustrative diagram illustrating an example of a virtual server management table;

FIG. 6 is an illustrative diagram illustrating an example of a virtual server communication history table;

FIG. 8 is an illustrative diagram illustrating an example of a configuration group table;

FIG. 10 is an illustrative diagram illustrating an example of an inter-server communication event count table;

FIG. 11 is an illustrative diagram illustrating an example of an inter-server distance table;

FIG. 15 is an illustrative diagram illustrating an example of a configuration group table derived by a running rule construction process;

FIG. 16 is an illustrative diagram illustrating an example of a configuration group table established using a running rule construction process;

FIG. 19 is an illustrative diagram illustrating an inter-server communication event count table for new server additions;

FIG. 20 is an illustrative diagram illustrating an inter-server distance table for new server additions;

FIG. 21 is an illustrative diagram illustrating an example of a configuration group table derived from group information;

FIG. 22 is an illustrative diagram illustrating a similarity group table including added virtual servers;

FIG. 23 is an illustrative diagram illustrating a configuration group table including added virtual servers;

FIG. 24 is an illustrative diagram illustrating a similarity group table corresponding to a configuration group table;

DESCRIPTION OF EMBODIMENTS

Detailed explanation follows below regarding an example of an exemplary embodiment of technology disclosed herein with reference to the drawings.

Figure 1:
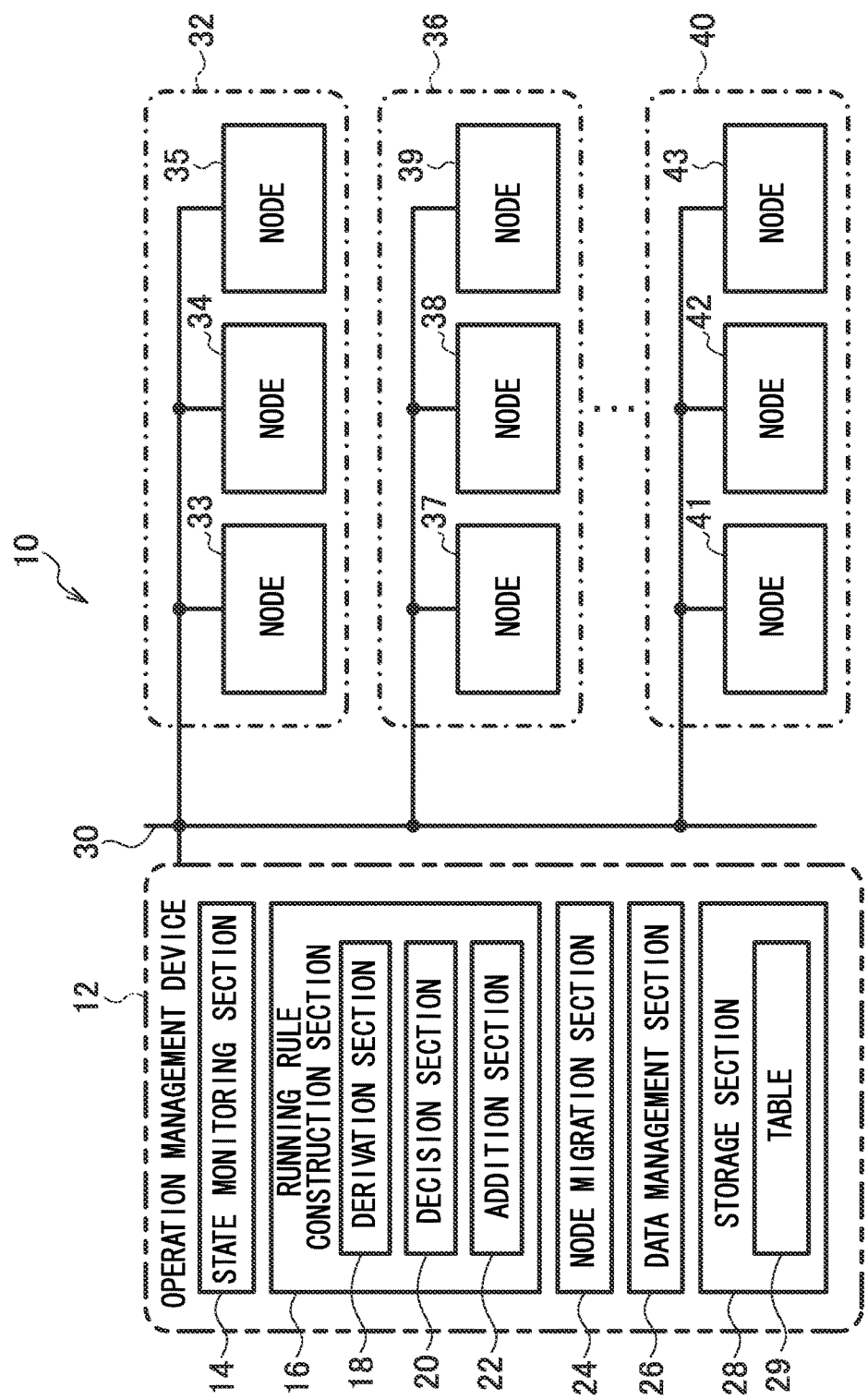
FIG. 1 is a block diagram illustrating a configuration of an operation management system according an exemplary embodiment.

FIG. 1 illustrates a configuration of an operation management system 10 according to the present exemplary embodiment. In the operation management system 10, an operation management device 12 and plural physical real computers managed by the operation management device 12 are connected together by a network 30 configured by a LAN or the like. FIG. 1 illustrates computers 32, 36, 40 as examples of plural physical real computers. The network 30 may include a communications network such as the internet.

The operation management device 12 is a device that manages operation for the computers 32, 36, 40 that are under management. The operation management device 12 is, for example, implemented by a computer, and more detailed description follows later. The operation management device 12 includes a state monitoring section 14, a running rule construction section 16, a node migration section 24, a data management section 26, and a storage section 28. The running rule construction section 16 includes a derivation section 18, a decision section 20, and an addition section 22. The storage section 28 stores information of a table 29.

The computer 32 includes nodes 33, 34, 35. The nodes 33 to 35 are, as an example, virtual servers obtainable using generally known virtualization processing capable of constructing plural systems using one computer. The computer 36 includes nodes 37, 38, 39. The computer 40 includes nodes 41, 42, 43.

FIG. 1 illustrates an example in which the three computers 32, 36, 40 serve as the plural computers (plural physical real computers) managed by the operation management device 12; however, there is no limitation to three computers, and provided there are two or more, any number may be employed.

The node 33 etc. included in the computer 32 etc., serving as examples of nodes of technology disclosed herein, may be applied as a virtual server obtainable using generally known virtualization. It is sufficient that the node 33 etc. of the computer 32 etc. allow node addition while operating, as described in more detail below. Namely, the initial construction of the operation management system 10 may include physical real computers that include no nodes, i.e. include no virtual servers.

Figure 2:
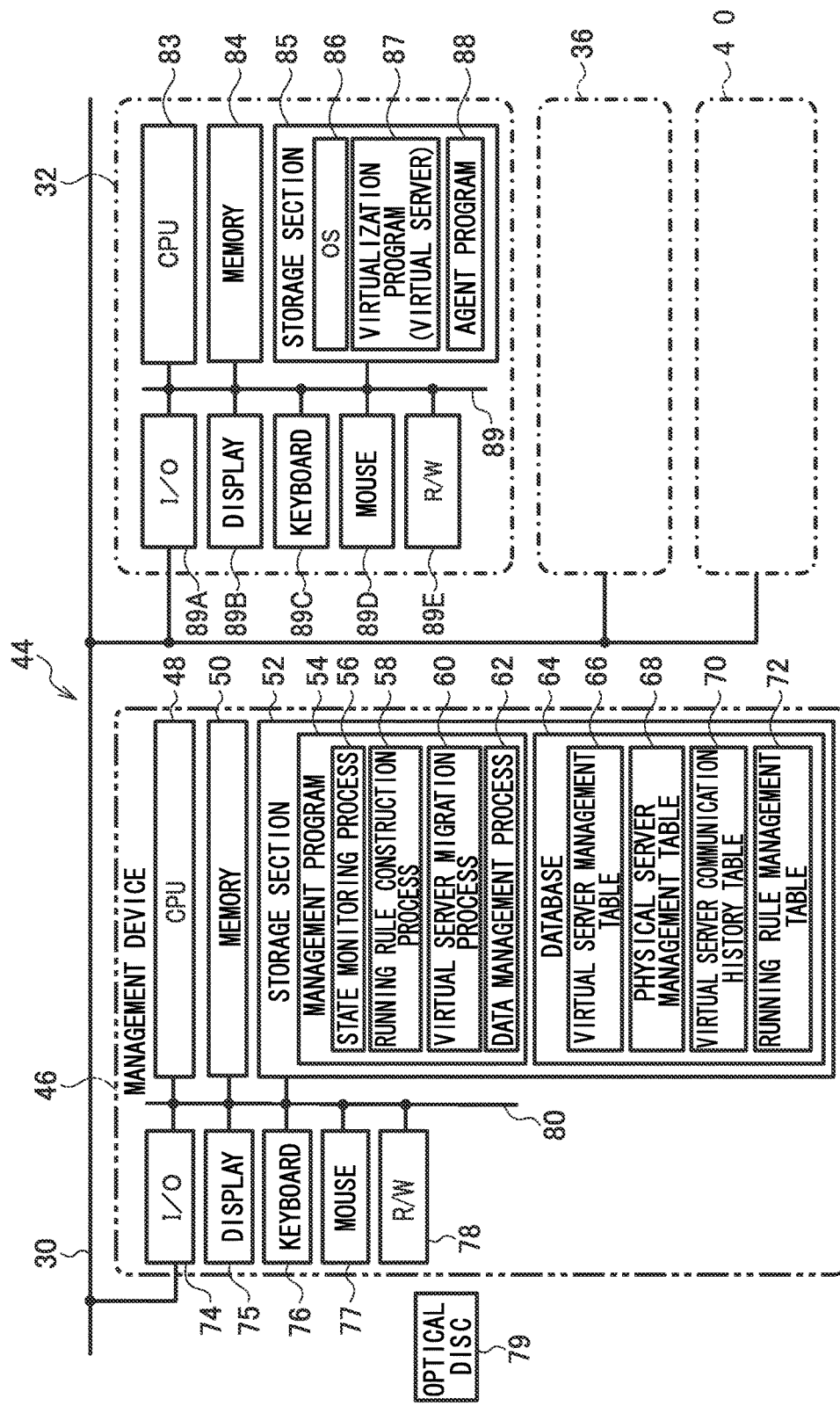
FIG. 2 is a block diagram illustrating a configuration of a computer system according to the exemplary embodiment.

FIG. 2 illustrates an example of a computer system 44 provided with a management device 46 that includes the operation management device 12 according to the present exemplary embodiment, and that is implemented by a computer.

The operation management device 12 may, for example, be implemented by the management device 46 illustrated in FIG. 2. The management device 46 may be implemented by a computer. In more detail, the management device 46 includes a CPU 48, memory 50, and a non-volatile storage section 52. The CPU 48, the memory 50, and the storage section 52 are mutually connected through a bus 80. The storage section 52 may be implemented by a hard disk drive (HDD), flash memory, or the like. The management device 46 is provided with an interface (I/O) 74 that connects to the network 30, and the I/O 74 is connected to the bus 80. The management device 46 also includes a display 75 that is a display apparatus serving as an example of an output device, and a keyboard 76 and a mouse 77 that are input apparatuses serving as examples of input devices. The display 75, the keyboard 76, and the mouse 77 are connected to the bus 80. The management device 46 is inserted with a recordable medium 79 such as an optical disc, is provided with a device (R/W) 78 that reads and writes with respect to the input recordable medium 79, and the device (R/W) 78 is connected to the bus 80. The display 75, the keyboard 76, the mouse 77, and the device (R/W) 78 may be omitted, or may be connected to the bus 80 as necessary.

The storage section 52 stores a management program 54 that executes processing that manages operation of plural computers by the management device 46. The CPU 48 reads the management program 54 from the storage section 52, expands the management program 54 into the memory 50, and sequentially executes the processes included in the management program 54. Namely, the operation management device 12 is implemented by the management device 46, and the management device 46 operates as the operation management device 12 due to the CPU 48 executing the management program 54.

The management program 54 is an example of an operation management program of technology disclosed herein. The management program 54 is a program that causes the management device 46 to function as the operation management device 12.

The management program 54 includes a state monitoring process 56, a running rule construction process 58, a virtual server migration process 60, and a data management process 62. The CPU 48 operates as the state monitoring section 14 of the operation management device 12 of FIG. 1 due to execution of the state monitoring process 56. Namely, the operation management device 12 is implemented by the management device 46, and the management device 46 operates as the state monitoring section 14 of the operation management device 12 due to execution of the state monitoring process 56. The CPU 48 operates as the running rule construction section 16 of the operation management device 12 of FIG. 1 due to execution of the running rule construction process 58. Namely, the operation management device 12 is implemented by the management device 46, and the management device 46 operates as the running rule construction section 16 of the operation management device 12 due to execution of the running rule construction process 58.

The CPU 48 operates as the node migration section 24 of the operation management device 12 of FIG. 1 due to execution of the virtual server migration process 60. Namely, the operation management device 12 is implemented by the management device 46 using a computer, and the management device 46 operates as the node migration section 24 of the operation management device 12 due to execution of the virtual server migration process 60. The CPU 48 operates as the data management section 26 of the operation management device 12 of FIG. 1 due to execution of the data management process 62. Namely, the operation management device 12 is implemented by the management device 46, and the management device 46 operates as the data management section 26 of the operation management device 12 due to execution of the data management process 62.

Although more detail follows later for each, the state monitoring process 56 included in the management program 54 is a program that monitors the state of each of the plural computers managed by the management device 46 in the computer system 44. The state monitoring process 56 is a program that monitors the state of each node (for example, virtual server) included in each of the plural computers. The running rule construction process 58 is a program that constructs running rules for the computers in the computer system 44. The virtual server migration process 60 is a program that controls migration of nodes (for example, virtual servers) included in the computers. A data management program 82 is a program that manages various information employed by the management device 46 for management of the computers in the computer system 44. The data management program 82 includes a program that manages models for operation in the computer system 44.

In the network 30 of the computer system 44, the computers 32, 36, 40 are connected together. The computers 32, 36, 40 are managed by the management device 46. Namely, physical servers functioning on physical real computers, and virtual servers that are virtual computers constructed on the physical servers, described in more detail later, are included in each of the computers 32, 36, 40, and are managed by the management device 46.

The computer 32 includes a CPU 83, memory 84, and a non-volatile storage section 85. The CPU 83, the memory 84, and storage section 85 are mutually connected through a bus 89. The storage section 85 may be implemented by a hard disk drive (HDD), flash memory, or the like. The computer 32 includes an interface (I/O) 89A that connects to the network 30, and the I/O 89A is connected to a bus 89. The computer 32 includes a display 89B, a keyboard 89C, and a mouse 89D. The display 89B, the keyboard 89C, and the mouse 89D are connected to the bus 89. The computer 32 is inserted with the recordable medium 79, includes a device (R/W) 89E that reads and writes with respect to the input recordable medium 79, and the device (R/W) 89E is connected to the bus 89. The display 89B, the keyboard 89C, the mouse 89D, and the device (R/W) 89E may be omitted, or may be connected to the bus 89 as necessary.

The storage section 85 of the computer 32 stores an operating system (OS) 86 that includes functional sections that cause the computer 32 to function as a physical server, and stores a virtualization program 87 that causes construction and operation of the virtual servers in the computer 32. The storage section 85 of the computer 32 also stores an agent program 88 that causes execution of device configurations and communication management of each of the physical servers and the virtual servers in the computer 32.

It is known that a physical server can be obtained by installing an OS, including so-called server functionality, to a single computer. Physical servers are often constructed as a single system that executes a single application program, like a mail server for example. In recent years, virtualization system technology that constructs plural virtual systems on one physical server, has been implemented with objectives such as increasing utilization efficiency of physical servers.

For example, plural virtual servers may be constructed on a single physical server. In virtualization system technology, a virtual server constructed on a given physical server may be migrated to another physical server.

Namely, the computer 32 functions as a physical server due to the CPU 83 reading the OS 86 from the storage section 85, expanding the OS 86 into the memory 84, and executing the OS 86. A virtual server operates on the physical server due to the CPU 83 reading the virtualization program 87 from the storage section 85, expanding the virtualization program 87 into the memory 84, and executing the virtualization program 87. Namely, when the computer 32 functions as a physical server, a virtual server may be constructed on the computer 32. In more detail, the computer 32 operates as a physical server due to the CPU 83 reading the OS 86 from the storage section 85, expanding the OS 86 into the memory 84, and executing the OS 86. The computer 32 operates as a virtual server due to the CPU 83 reading the virtualization program 87 from the storage section 85, expanding the virtualization program 87 into the memory 84, and executing the virtualization program 87. Virtual servers are therefore computers virtually generated in physical servers. Communication management and the like of each of the physical servers and the virtual servers operating on the physical servers is executed by reading the agent program 88 from the storage section 85, expanding the agent program 88 into the memory 84, and executing the agent program 88.

Since configuration of the computer 36 and the computer 40 is substantially similar to that of the computer 32, detailed explanation thereof is omitted.

Figure 3:
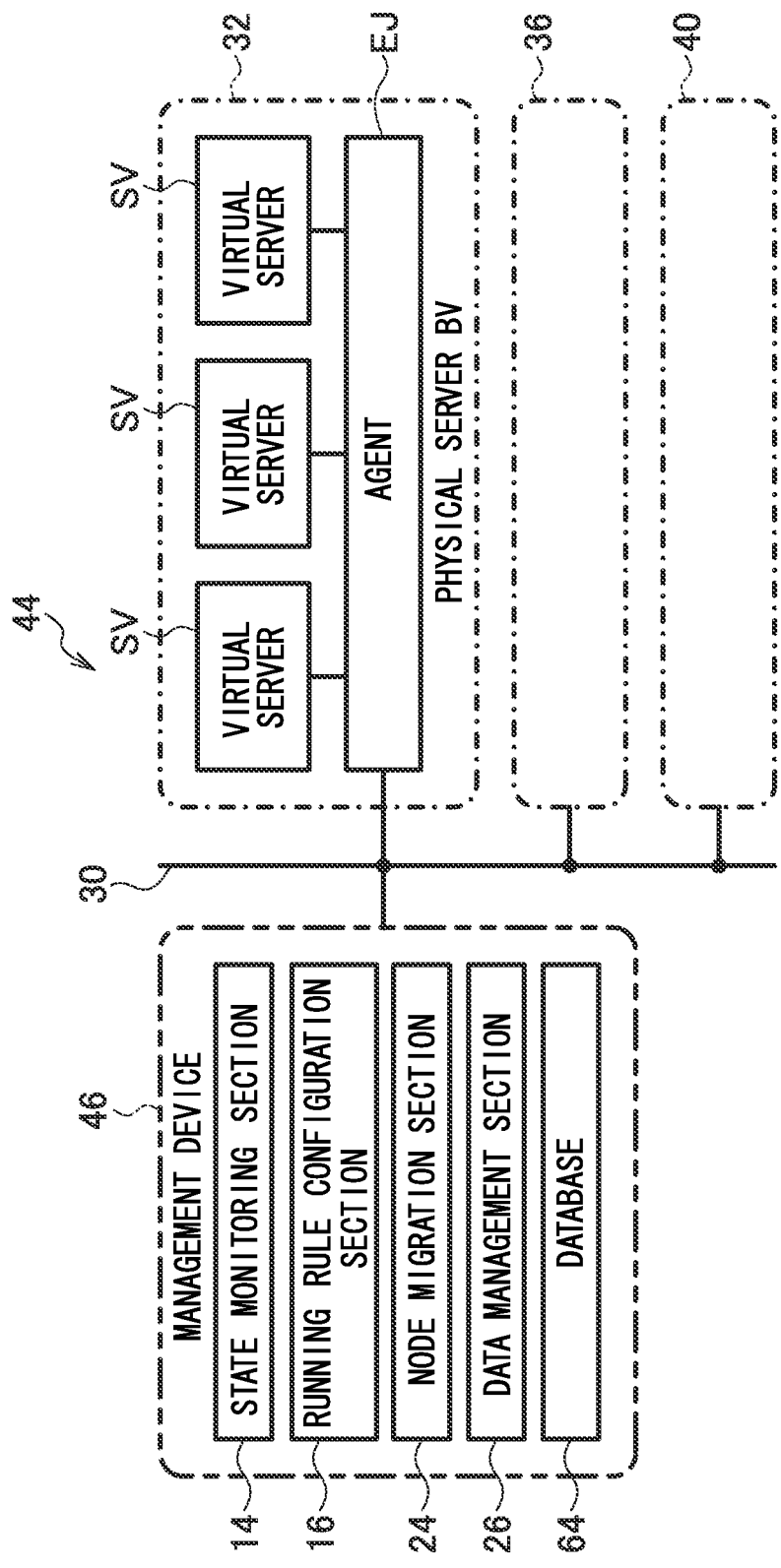
FIG. 3 is an illustrative diagram illustrating a configuration related to implementing a computer system.

FIG. 3 illustrates a configuration related to operation in the computer system 44 when the management program 54 is executed by the management device 46, and the computer 32 executes the OS 86, the virtualization program 87, and the agent program 88.

The management device 46 of the computer system 44 operates as the state monitoring section 14, the running rule construction section 16, the node migration section 24, and the data management section 26 of the operation management device 12 (FIG. 1) due to the management program 54 being executed by the management device 46. The computer 32 operates as a physical server due to execution of the OS 86 in the computer 32. The computer 32 operates as a virtual server due to execution of the virtualization program 87 in the computer 32. In FIG. 3, a computer operating as a physical server is denoted physical server BV. Functional sections of a virtual server are denoted virtual server SV. The computer 32 operates as agent functional sections due to execution of the agent program 88 in the computer 32. In FIG. 3, agent functional sections are denoted agent EJ. In FIG. 3, an example is illustrated in which the computer 32 operates as a physical server, and three virtual servers are included in the physical server.

In the following explanation, the labels A to C are appended when focusing on an individual physical server out of plural physical servers BV, and the physical servers BV are treated as mutually distinct. The virtual servers SV are appended with reference numerals when focusing on an individual virtual server out of plural virtual servers SV, and the virtual servers SV are being treated as mutually distinct.

As illustrated in FIG. 2, the storage section 52 of the management device 46 stores a database 64 including a virtual server management table 66, a physical server management table 68, a virtual server communication history table 70, and a running rule management table 72. The database 64 stored in the storage section 52 of the management device 46 corresponds to the storage section 28 of the operation management device 12 of FIG. 1. The virtual server management table 66, the physical server management table 68, the virtual server communication history table 70, and the running rule management table 72 correspond to examples of tables 29 included in the storage section 28 of the operation management device 12 of FIG. 1.

FIG. 4 illustrates an example of a physical server management table 68 stored in the database 64. The physical server management table 68 is registered with information for managing the CPU and memory of a physical server BV when a computer included in the computer system 44 functions as the physical server BY.

In more detail, respective information of a "physical server ID", a "physical server name", an "IP address", an "available processor capacity", and an "available memory capacity" are registered associated with one another in the physical server management table 68. Information that identifies the physical server BV when a computer included in the computer system 44 functions as the physical server BV is registered in the "physical server ID". Information that indicates a title of the physical server BV is registered in the "physical server name". Information that indicates the location of the physical server BV on the network is registered in the "IP address". Information that indicates processor capacity available for use by the physical server BV, indicating a CPU load or the like, is registered in the "available processor capacity". Information that indicates memory capacity available for use by the physical server BV is registered in the "available memory capacity".

FIG. 5 illustrates an example of the virtual server management table 66 stored in the database 64. Information for managing the CPU and the memory of virtual servers SV constructed on the physical servers BV is registered in the virtual server management table 66.

For example, respective information of a "virtual server ID", a "virtual server name", an "IP address", an "available processor capacity", an "available memory capacity", and a "location" are registered associated with one another in the virtual server management table 66. Information that identifies virtual servers SV constructed on the physical servers BV is registered in the "virtual server ID". Information that indicates titles of the virtual servers SV is registered in the "virtual server name". Information that indicates the locations of the virtual servers SV on the network is registered in the "IP address". Information that indicates a processor capacity available for use by the virtual server SV, indicating a CPU load or the like, is registered in the "available processor capacity". Information that indicates a memory capacity available for use by the virtual server SV is registered in the "available memory capacity". Information that indicates the locations of the physical servers BV on which the virtual servers SV operate is registered in the "location". In FIG. 5, a case employing unique titles of physical servers BV on the network is illustrated as an example of information indicating the locations of the physical servers BY. The information indicating the locations of the physical servers BV may be IP addresses or the like.

FIG. 6 illustrates an example of a virtual server communication history table 70 stored in the database 64. Information for managing information such as packets communicated between virtual servers SV is registered in the virtual server communication history table 70.

For example, respective information of a "time", a "transmission origin IP", a "port number", a "reception destination IP", a "port number", and a "communication volume" are registered associated with one another in the virtual server communication history table 70. Information indicating the time when the communication between virtual servers SV occurred is registered in the "time". Information indicating the location of the transmission side virtual server SV on the network is registered in the "transmission origin IP". Information indicating the port number employed by the transmission side virtual server SV for the communication is registered in the "port number" that follows "transmission origin IP". Information that indicates the location of the reception side virtual server SV on the network is registered in the "reception IP". Information that indicates the port number employed by the reception side virtual server SV for the communication is registered in the "port number" following the "reception side IP". Information indicating the information volume employed in the communication between the virtual servers SV is registered in the "communication volume".

Figure 7:
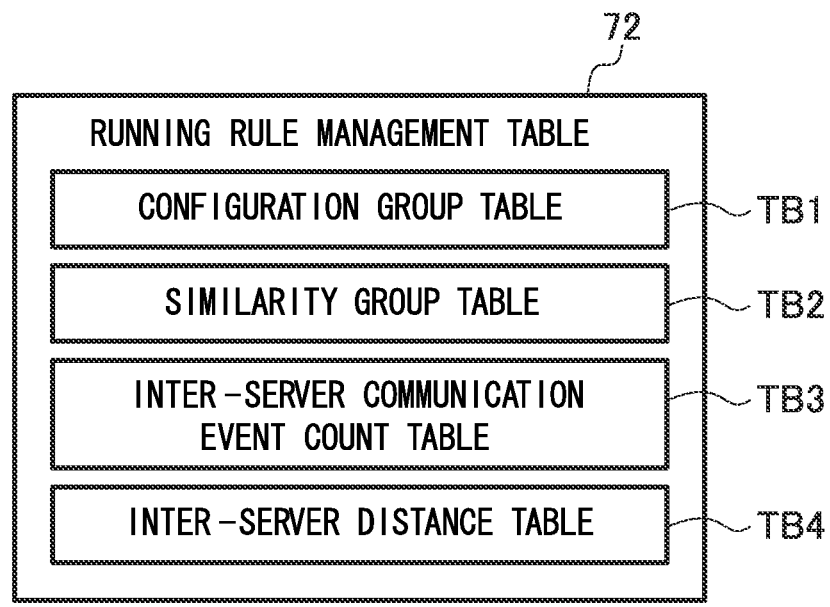
FIG. 7 is an illustrative diagram illustrating an example of a running rule management table.

FIG. 7 illustrates an example of the running rule management table 72 stored in the database 64. Information for managing relationships between plural virtual servers SV in the computer system 44 is registered in the running rule management table 72. The running rule management table 72 includes a configuration group table TB1, a similarity group table TB2, an inter-server communication event count table TB3, and an inter-server distance table TB4. FIG. 8 to FIG. 11 illustrate examples for the configuration group table TB1, the similarity group table TB2, the inter-server communication event count table TB3, and the inter-server distance table TB4 included in the running rule management table 72.

FIG. 8 illustrates an example of the configuration group table TB1. Information related to plural virtual servers SV operating with dependency relationships, and information related to operating physical servers BV in the computer system 44 is registered in the configuration group table TB 1.

For example, respective information of a "configuration group", a "similarity group", "assigned virtual servers", a "location", and a "running configuration" are registered associated with one another in the configuration group table TB1. Plural virtual servers SV operating with dependency relationships are classified into broad categories, and information that represents the broad categories is registered in the "configuration group". Information that represents intermediate categories within the broad categories, classified as, for example, types of virtual servers SV having high similarity to each other, is registered in the "similarity group". Similarity is explained later. The virtual servers SV assigned to the broad categories are classified into narrow categories with information indicating these virtual servers SV is registered in the "assigned virtual server". An example of information indicating a virtual server SV, is information indicating a title or the like of a virtual server SV that identifies the virtual server SV. Information indicating the physical server BV on which a virtual server SV is operating is registered in the "location". An example of information indicating a physical server BV is information indicating the title or the like of a physical server BV that identifies a physical server BY.

Information indicating placements, in the computer system 44, of plural virtual servers SV assigned to a broad category is registered in the "running configuration" represented in the configuration group table TB1. Namely, the "running configuration" information indicates placement configurations that plural virtual servers SV are operating on, with respect to physical servers BV operating in the computer system 44. More specifically, information indicating a "concentrated configuration" or a "distributed configuration" is registered in the "running configuration". The information indicating a "concentrated configuration" indicates that the virtual servers SV assigned to a broad group operating with dependency relationships, are operating in a single physical server BV in the computer system 44. Information indicating a "distributed configuration" indicates that the virtual servers SV assigned to a broad group are operating separately between different physical servers BV in the computer system 44.

Figure 9:
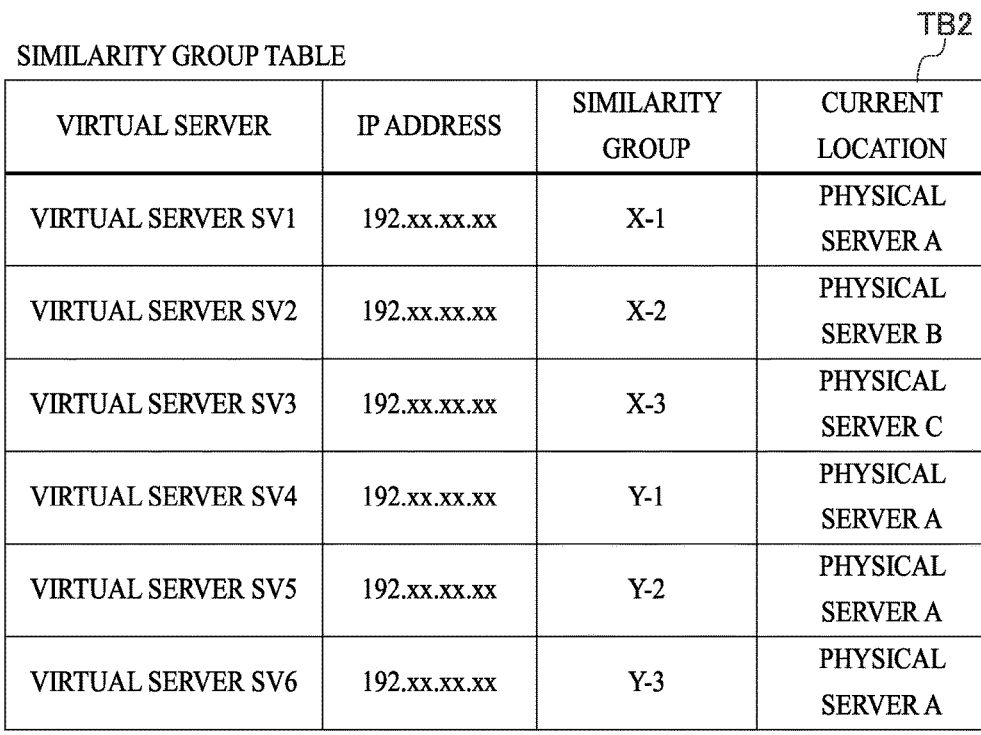
FIG. 9 is an illustrative diagram illustrating an example of a similarity group table.

FIG. 9 illustrates an example of the similarity group table TB2. Information indicating similarity groups corresponding to each of the virtual servers SV is registered in the similarity group table TB2.

For example, respective information of a "virtual server", an "IP address", a "similarity group", and a "current location" are registered associated with one another in the similarity group table TB2. Information indicating a title or the like of a subject virtual server SV that identifies the virtual server SV is registered in the "virtual server". Information indicating the location of the subject virtual server SV on the network is registered in the "IP address". Information that identifies groups having similarity, into which the subject virtual server SV is classified, is registered in the "similarity group". Information indicating the physical server BV on which the subject virtual server SV is operating is registered in the "current location". An example of information indicating a physical server BV is information indicating a title or the like of the physical server BV that identifies the physical server BY.

FIG. 10 illustrates an example of the inter-server communication event count table TB3. Information indicating a communication event count of communications between virtual servers SV in the computer system 44 is registered in the inter-server communication event count table TB3.

For example, a matrix table in which plural virtual servers SV of the computer system 44 are arrayed is applied in the inter-server communication event count table TB3, with the vertical axis as the transmission side, and the horizontal axis as the reception side. The information of the communication event count between virtual servers SV for combinations of virtual servers SV is registered in the inter-server communication event count table TB3 using the matrix table. In FIG. 10, the virtual servers SV are denoted virtual server SV1 to virtual server SV6 in order to distinguish between each of six virtual servers SV.

FIG. 10 illustrates an example of "external section 1", and "external section 2" in addition to virtual servers SV. "External section 1" indicates when communication from an server external to the computer system 44 occurs with the virtual servers SV. Namely, this indicates when communication between a given virtual server SV and an external server occurs. If the inter-server communication event count table TB3 is limited to communication between the virtual servers SV, a virtual server SV that executes communication with an external server, is sometimes discriminated as a virtual server SV of same type as, or having high similarity with, a virtual server SV that does not execute communication with an external server. For example, sometimes each virtual server SV having a short inter-server distance is discriminated as high similarity, as described in detail later. Thus, communications with the virtual servers SV from external servers is considered in order to avoid discriminating a virtual server SV that executes communication with an external server, as a virtual server SV of the same type as, or having high similarity with, a virtual server SV that does not execute communication with an external server.

FIG. 11 illustrates an example of the inter-server distance table TB4. Information indicating distance relationships between plural virtual servers SV in the computer system 44 is registered in the inter-server distance table TB4.

For example, a matrix table in which plural virtual servers SV of the computer system 44 are arrayed on the horizontal axis and the vertical axis is applied in the inter-server distance table TB4. Information indicating distances between virtual servers SV for combinations of the virtual servers SV is registered in the inter-server distance table TB4 using the matrix table.

Explanation follows regarding an example of how distances between virtual servers SV are found. Euclidean distances are found as examples of distances between virtual servers SV in the present exemplary embodiment. More specifically, communication event counts to the respective virtual servers SV are taken as vector values, and inter-virtual server VS scalar quantities are found. The found inter-virtual server VS scalar quantities are taken as information indicating distances between the virtual servers SV.

Namely, the Euclidean distances are scalar quantities defined with respect to an n-component vectors, f, g, according to the following equation:

$$d(f, g) = \sqrt{\sum_{i=1}^{n} (f_i - g_i)^2} \quad (1)$$

In the n-component vectors, f g, n corresponds to the total number of virtual servers, f corresponds to one virtual server, and g corresponds to the other virtual server. The results of the above equation when the variable i is incremented from 1 to n are registered as information indicating distances between virtual servers.

Explanation next follows regarding operation of the present exemplary embodiment.

Explanation follows of an example in which, in business processing employing plural computers (virtual servers SV) having inter-computer dependency relationships, virtual servers SV are added because of increases of processing load in business processing or the like (known as scaling-out) in the present exemplary embodiment.

Explanation follows of a case in which a 3-tier system, serving as an example in which plural computers having dependencies, is operated in the present exemplary embodiment. An example of a three tier system is a system constructed from a client server system divided into three tiers: a "presentation tier", an "application tier", and a "data tier". More specifically, having a web server (WEB_SERVER) serve as the "application tier", an application server (AP_SERVER) serve as the "application tier", and a database server (DB_SERVER) server as the "data tier" is a known configuration.

Server-client systems are known as another example of plural computers operating with dependency relationships. A server-client system is a system divided into a computer that controls a specific role (a server), and a computer that has the role being operated by a user (a client), and these are mutually connected through a network. Peer to peer systems are known as another example of plural computers operating with dependency relationships. A peer to peer system is a system where computers, participating in a network without fixed roles, exchange data with each other, and the computers have functions of both servers and clients.

Figure 12:
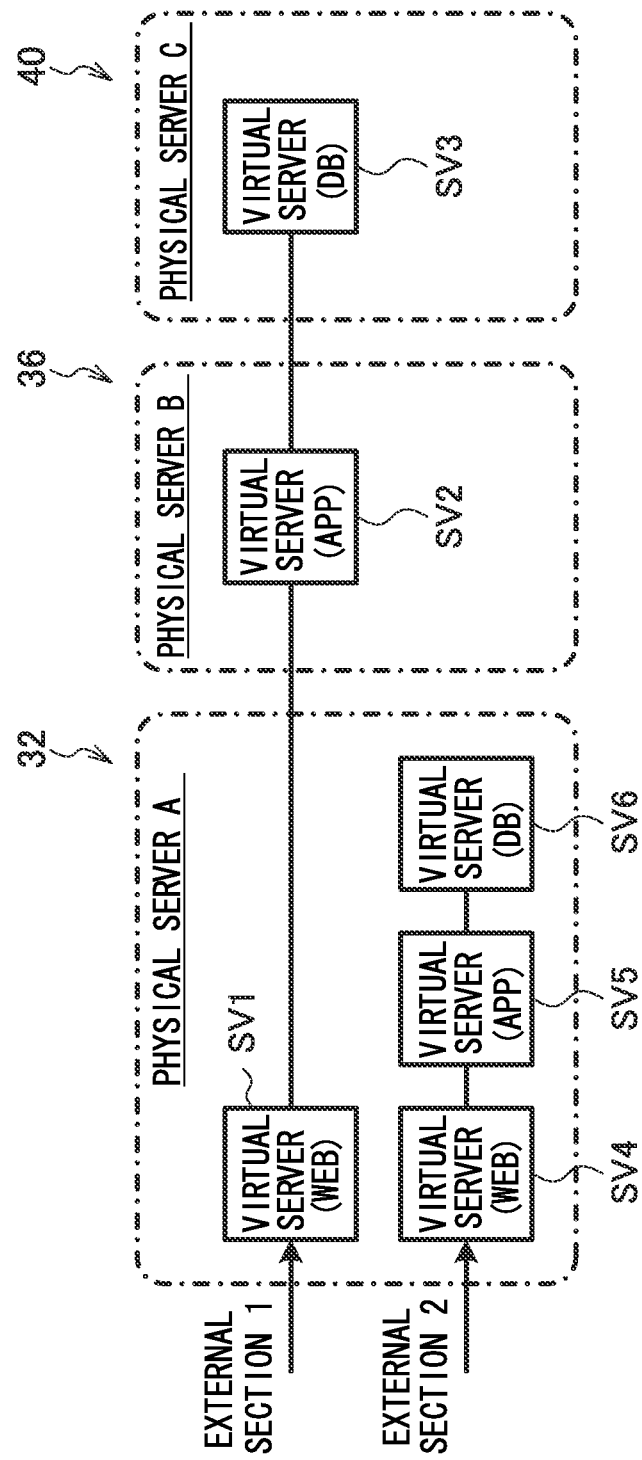
FIG. 12 is an illustrative diagram illustrating an example of plural computers with dependency relationships.

As an example of plural computers with dependency relationships, FIG. 12 illustrates relationships between plural physical servers BV and plural virtual servers SV functioning in the computers 32, 36, 40 in the computer system 44 managed by the management device 46. A case is illustrated in which the computer 32 functions as a physical server A, with four virtual servers SV1, SV4, SV5, and SV6 constructed thereon. Moreover, in the case illustrated, the computer 36 functions as a physical server B, with the single virtual server SV2 constructed thereon, and the computer 40 functions as a physical server C, with the single virtual server SV3 constructed thereon. Note that the agents EJ (FIG. 3) are omitted from illustration in FIG. 12.

When initially constructing a virtual server SV that performs business processing employing plural computers with dependency relationships, a user deliberately decides the locations in the physical servers BV at which the plural virtual servers SV will operate. There are, for example, cases in which the choice is made such that business processing operates with all of the virtual servers SV concentrated on one of the physical servers BV, and cases in which the choice is made such that business processing operates with plural virtual servers SV distributed between the individual physical servers BY.

As an example, FIG. 12 illustrates a case where the user makes the choice that business processing operates with the plural virtual servers SV distributed between the individual physical servers BV, and where operating locations of the virtual servers SV are set according to this choice. More specifically, the operating locations of the virtual servers SV1, SV2, SV3 are respectively distributed between physical servers A, B, C. The virtual server SV1 functions as the web server, the virtual server SV2 functions as the application server, and the virtual server SV3 functions as the database server. In FIG. 12, the virtual server SV1 functioning as the web server is denoted "(WEB)", the virtual server SV2 functioning as the application server is denoted "(APP) ", and the virtual server SV3 functioning as the database server is denoted "(DB)".

Another example illustrated in FIG. 12 is a case in which the user makes the choice that business processing operates with all of the virtual servers SV concentrated on one of the physical servers BV, and the operating locations of the virtual servers SV are set according to this choice. More specifically, the operating locations of all of the virtual servers SV4 to SV6 are set to the physical server A alone. The virtual server SV4 functions as the web server, the virtual server SV5 functions as the application server, and the virtual server SV6 functions as the database server.

First, when power is input to the management device 46, processing by management program 54 is executed by the management device 46. Namely, processing of the processes included in the management program 54 are executed due to the CPU 48 of the management device 46 reading the management program 54 from the storage section 52, expanding the management program 54 into the memory 50, and executing the management program 54.

Explanation next follows regarding data management processing by the data management process 62 included in the management program 54. The data management processing is executed due to the CPU 48 of the management device 46 reading the management program 54 from the storage section 52, expanding the management program 54 into the memory 50, and executing the management program 54. An example of the data management processing is management processing of the tables registered in the database 64. Namely, the data management processing references and updates the information in each table of the virtual server management table 66, the physical server management table 68, the virtual server communication history table 70, and the running rule management table 72.

In the explanation below, referencing of each table of the virtual server management table 66 to the running rule management table 72 registered in the database 64 is executed by the data management section 26 (FIG. 1) according to the data management process 62, under the CPU 48 of the management device 46. Updating of each of the tables out of the virtual server management table 66 to the running rule management table 72 is also executed by the data management section 26 (FIG. 1) according to the data management process 62, using the CPU 48 of the management device 46.

At start-up, and periodically thereafter, the CPU 48 of the management device 46 executes the state monitoring process 56 included in the management program 54.

Figure 13:
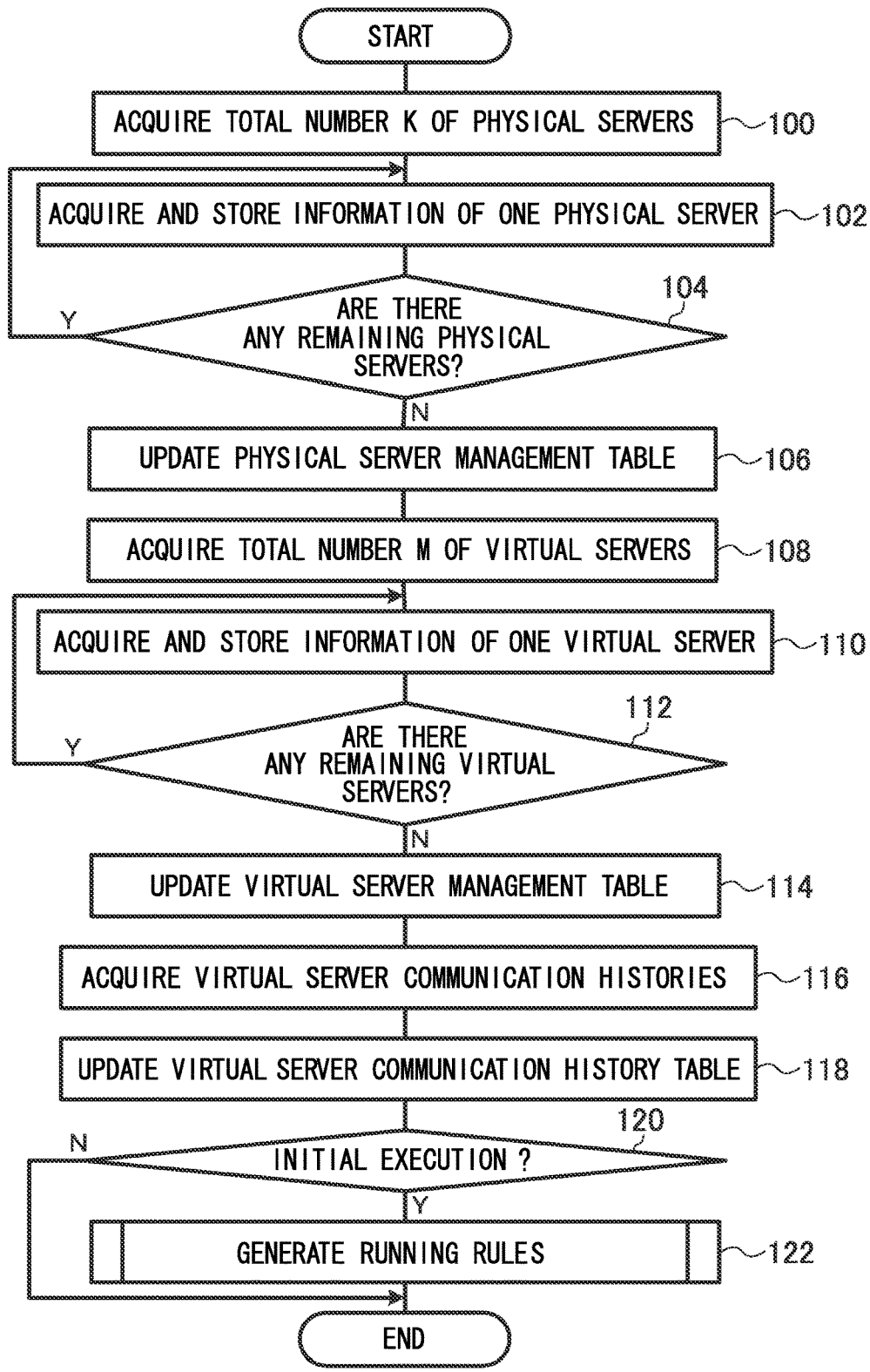
FIG. 13 is a flowchart illustrating a flow of a state monitoring process.

FIG. 13 illustrates a flow of the state monitoring process 56 included in the management program 54 executed by the management device 46. The management device 46 operates as the state monitoring section 14 of the operation management device 12 (FIG. 1) due to the execution of the state monitoring process 56 by the management device 46, and the state monitoring processing is executed for each out of the physical servers A to C and the virtual servers SV1 to SV6. The processing routine illustrated in FIG. 13 is repeatedly executed at specific time intervals during operation of the management device 46. The state monitoring processing resulting from execution of the state monitoring process 56 is processing that monitors communication states and resource states of the plural physical servers BV and the plural virtual servers SV managed by the management device 46. The processing routine illustrated in FIG. 13 is not limited to repeated execution, and may be configured to be executed according to operation instructions by a user from input devices such as the keyboard 76 and the mouse 77.

At step 100, the CPU 48 of the management device 46 acquires a total number K of the physical servers BY. Namely, the management device 46 requests an information response indicating the physical servers BV that are operating, from agents EJ being executed by the computers 32 to 40 connected to the network 30. In response to the request from the management device 46, each of the computers 32 to 40 respond with information indicating the operating physical servers BV when physical servers BV are operating thereon. The management device 46 acquires a total number K of the physical servers BV using the information response sent from each agent EJ. In the present exemplary embodiment, the management device 46 acquires information of "K=3" since the physical servers A to C are operating.

Next, at step 102 the CPU 48 of the management device 46 acquires operating states for one of the operating physical servers BY. Namely, the management device 46 requests an information response indicating the operating state of the physical server BV from the agent EJ of one of the operating physical servers A to C. The agent EJ of the one of the operating physical servers A to C that received the response request from the management device 46 acquires information indicating the resources of the physical server (the one of A to C) controlled by the agent EJ. Examples of the information indicating the resources of the physical server BV include information indicating the available CPU capacity and the available memory capacity at initial construction, the current CPU usage amount and memory usage amount, the capacity of the storage section (for example, a hard disk), and a network load. As information indicating the operating state, the agent EJ responds to the management device 46 with information in which the title or the IP address of the physical server BV, identifying the physical server BV controlled by the agent EJ, is associated with information indicating the resources. Information indicating the operating state response sent to the management device 46 may include the communication volume communicated by the physical server BY. The management device 46 temporarily stores the information sent in response from each of the agents EJ, and when a physical server BV remains for which acquisition of information indicating operating state has not been completed (when affirmative determination is made at step 104), processing returns to step 102.

When acquisition of information indicating operating state has been completed for all of the operating physical servers BV (when negative determination is made at step 104), at step 106 the CPU 48 of the management device 46 updates the physical server management table 68. Namely, the physical server management table 68 is updated in the management device 46 according to information indicating the operating state of each of the physical servers A to C of the responses sent from the physical servers A to C.

Next, at step 108 the CPU 48 of the management device 46 acquires a total number M of virtual servers SV. Namely, the management device 46 requests an information response indicating that the virtual servers SV1 to SV6 are operating, from the agents EJ being executed by the computers 32 to 40 connected to the network 30. Each of the virtual servers SV1 to SV6 operates on one of the physical servers A to C, and is managed by the agents EJ being executed on the respective physical servers A to C. Response information indicating the virtual servers SV being managed are operating is accordingly sent by the agents EJ in response to the request from the management device 46. The management device 46 acquires a total number M of virtual servers SV using the information response sent from each agent EJ. In the present exemplary embodiment, the management device 46 acquires information of "M=6" since four virtual servers SV1, SV4 to SV6 are operating on the physical server A, one virtual server SV2 is operating on the physical server B, and one virtual server SV3 is operating on the physical server C (FIG. 12).

Next, at step 110 the CPU 48 of the management device 46 acquires the operating state for one out of the operating virtual servers SV1 to SV6. Namely, similarly to at step 108, the management device 46 requests an information response indicating the operating state of the virtual server SV from the agent EJ. The agent EJ from which a response was requested by the management device 46, acquires information indicating resources of the virtual servers SV under management by that agent EJ. For example, the agent EJ being executed on the physical server A acquires information indicating resources of each of the four virtual servers SV1, SV4 to SV6 managed the agent EJ.

An example of information indicating the resources of the virtual servers SV includes information indicating the available CPU capacity and the available memory capacity at initial construction, the current CPU usage amount and memory usage amount, the available capacity of the storage section (for example, a hard disk), and a network load. As information indicating the operating state, the agent EJ responds to the management device 46 with information in which the title or the IP address of the virtual server SV, identifying the virtual server SV controlled by the agent EJ, is associated with information indicating the resources. Information indicating the operating state in the response sent to the management device 46 may include the communication volume communicated by the respective virtual servers SV1 to SV6. The management device 46 temporarily stores the information sent in response from each of the agents EJ, and when a virtual server SV remains for which acquisition of information indicating operating state has not been completed (when affirmative determination is made at step 112), processing returns to step 110.

When acquisition of information indicating operating state has been completed for all of the operating virtual servers SV1 to SV6 (when negative determination is made at step 112), at step 114 the CPU 48 of the management device 46 updates the virtual server management table 66. Namely, the virtual server management table 66 is updated in the management device 46 according to the information indicating the operating state of each of the virtual servers SV1 to SV6 of the responses sent from each of the agents EJ.

Next, at step 116 the CPU 48 of the management device 46 acquires communication histories of the virtual servers SV. Namely, the management device 46 requests response information indicating communication histories for communications made by the virtual servers SV under management with other virtual servers SV, from each of the agents EJ. The agents EJ from which an information response indicating the communication histories was requested acquire information indicating the communication histories of the virtual servers SV under management, and respond to the management device 46 with the acquired information indicating the communication histories of the virtual servers SV. The management device 46 temporarily stores the information indicating the communication histories sent in response from each of the agents EJ. Examples of the information indicating communication history of the virtual servers SV include information indicating each out of a "communication start time", a "transmission origin IP address", a "transmission origin port number", a "reception destination IP address", a "reception destination port number", and a "communication volume". The transmission origin and reception destination virtual server SV can be identified by employing the IP address. The type of transmission origin and reception destination virtual server SV can be identified by employing the port number. In the present exemplary embodiment, the type of the virtual server SV is identified as one out of web server, application server, or database server.

The state monitoring processing for each out of the physical servers A to C and the virtual servers SV1 to SV6 is completed in the management device 46 by the above processing. Irregularity detection for each out of the physical servers A to C is also performed in the state monitoring processing.

When the plural virtual servers SV having dependency relationships are initially constructed, a user deliberately decides one or plural physical servers BV on which each of the plural virtual servers SV will operate in order to perform business processing. However, ascertaining the physical servers BV decided deliberately by the user on which each of the plural virtual servers SV operate, namely, ascertaining information related to the operating locations of the plural virtual servers SV, is problematic when only the respective states of the physical servers BV and the virtual servers SV are monitored by the management device 46. Information related to the operating locations of the plural virtual servers SV decided deliberately by the user are running rules relating to placements of the plural virtual servers SV with respect to one or plural of the physical servers BY. Namely, rules stipulating on which physical servers BV the plural virtual servers SV with dependency relationships are allowed to operate are the running rules.

Thus, in the present exemplary embodiment, when monitoring the respective states of the physical servers BV and the virtual servers SV, the management device 46 executes processing to ascertain the running rules. In the present exemplary embodiment, information indicating the running rules includes information indicating groups representing plural virtual servers SV operating with dependency relationships, and information related to operating locations indicating on which of the physical servers BV the virtual servers SV are operating (location information).

When state monitoring processing is completed by completing the processing of step 118, at step 120 the CPU 48 of the management device 46 determines whether or not it was initial execution of the processing illustrated in FIG. 13. For the determination of step 120, the determination value may be set as the first time the processing routine illustrated in FIG. 13 executes, or as execution within a predetermined fixed number of times.

When negative determination is made at step 120, the current processing routine ends. The state monitoring processing for each of the plural physical servers BV and the plural virtual servers SV is accordingly executed at a specific time interval.

When affirmative determination is made at step 120, the CPU 48 of the management device 46 ends the current processing routine after the running rules have been initially constructed at step 122. Namely, at step 122 the CPU 48 of the management device 46 executes the running rule construction process 58.

Figure 14:
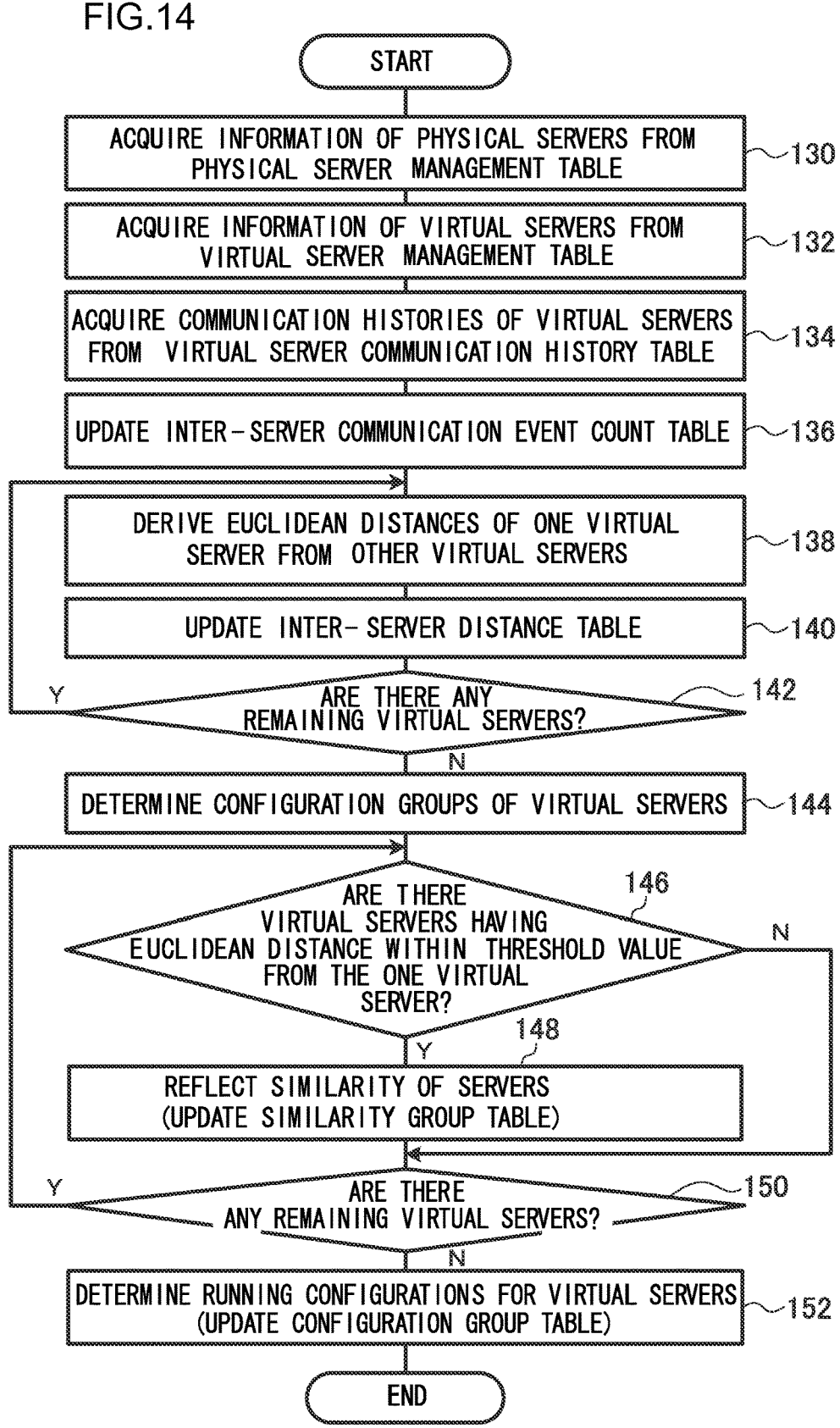
FIG. 14 is a flowchart illustrating a flow of a running rule construction process.

FIG. 14 illustrates a flow of the running rule construction process 58 included in the management program 54 executed by the management device 46. The management device 46 operates as the running rule construction section 16 of the operation management device 12 (FIG. 1) due to the running rule construction process 58 being executed by the management device 46, and the construction processing of the running rules executes. As described below, during operation of the management device 46, the processing routine illustrated in FIG. 14 may be repeatedly executed at a specific time interval, and may be executed when the virtual servers SV are newly constructed. The processing routine illustrated in FIG. 14 may be executed according to operation instructions by a user from input devices such as the keyboard 76 and the mouse 77.

At step 130, the CPU 48 of the management device 46 acquires information related to the physical servers BV from the physical server management table 68 stored in the database 64, and at the next step 132, acquires information related to the virtual servers SV from the virtual server management table 66. As the information related to the virtual servers SV1 to SV6, the CPU 48 may acquire the total number of the virtual servers SV and the locations of the virtual servers SV on the physical servers BY. Namely, the CPU 48 may acquire information indicating the total number of the virtual servers SV by summing the number of the virtual servers SV registered in the virtual server management table 66. The CPU 48 can acquire the information indicating the locations of the virtual servers SV on the physical servers BV by acquiring information indicating the physical server locations for the virtual servers SV registered in the virtual server management table 66.

Next, at step 134 the CPU 48 of the management device 46 acquires information indicating the communication histories of the virtual servers SV from the virtual server communication history table 70 stored in the database 64.

Next, at step 136, the CPU 48 of the management device 46 updates the inter-server communication event count table TB3 based on the virtual server management table 66, the physical server management table 68, and the virtual server communication history table 70. Namely, at each time in the virtual server communication history table 70, the virtual server SV corresponding to the transmission origin IP, and the virtual server SV corresponding to the reception destination IP are identified, and the count of communication events between the identified virtual servers SV is incremented by 1. When calculation of communication event counts has been completed for all of the time included in the virtual server communication history table 70, the inter-server communication event count table TB3 is updated with the calculated counts of communication events between the virtual servers SV. Discrimination that virtual servers SV that engage in a communication chain correspond to a single group can be made from the inter-server communication event count table TB3 as described below.

In the present exemplary embodiment, the computers 32, 36, 40 in the computer system 44 managed by the management device 46 function as the physical servers A, B, C, and the six virtual servers SV1 to SV6 are constructed. The inter-server communication event count table TB3 updated at step 136 above thus becomes a table in which the external section 1 and the external section 2 have been added in addition to the six virtual servers SV1 to SV6 (see FIG. 10).

Next, at steps 138 to 142, the CPU 48 of the management device 46 derives the information indicating similarities between the virtual servers. First, at step 138 the CPU 48 of the management device 46 derives the Euclidean distances between the virtual servers. Namely, using Equation (1), the respective Euclidean distances are found from a given virtual server VS to every other virtual server SV. Next, at step 140, for the Euclidean distances found at step 138, the CPU 48 of the management device 46 updates the corresponding values in the inter-server distance table TB4. Next, at step 142 the CPU 48 of the management device 46 determines whether or not there are remaining virtual servers SV. Namely, the CPU 48 makes an affirmative determination at step 142 when the total number of virtual servers SV acquired at step 132 has not been reached, returns processing to step 138, and repeats the processing to derive the information indicating the similarities between the virtual servers for the remaining virtual servers SV.

When processing to derive the information indicating similarities between the virtual servers has been completed for all of the virtual servers SV (when negative determination is made at step 142), the CPU 48 transitions processing to step 144.

In the present exemplary embodiment, the computers 32, 36, 40 function as the physical servers A, B, C, and the six virtual servers SV1 to SV6 are constructed. The inter-server distance table TB4 updated at step 140 above accordingly becomes a table indicating distances between the six virtual servers SV1 to SV6 (see FIG. 11).

Next, at step 144 the CPU 48 of the management device 46 derives the information indicating groups representing plural virtual servers SV operating with dependency relationships. The CPU 48 operates as the derivation section 18 included in the running rule construction section 16 of the operation management device 12 of FIG. 1 by executing step 114 of the running rule construction process 58. Namely, the operation management device 12 is implemented by the management device 46, and the management device 46 operates as the derivation section 18 included in the running rule construction section 16 of the operation management device 12 due to execution of step 144 of the running rule construction process 58.

At step 144, the CPU 48 of the management device 46 regards as server groups performing the same type of business processing and engaging in a communication chain, the virtual servers SV identified as virtual servers communicating with each other at step 136, and these are set to configuration groups. More specifically, the CPU 48 of the management device 46 references the inter-server communication event count table TB3, and virtual servers SV for which the count of communication events with the subject virtual server SV exceeds a predetermined count, are set to a configuration group performing the same type of business processing as the subject virtual server SV.

FIG. 15 illustrates an example of a configuration group table TB1-1 derived at step 144 of the running rule construction process 58. For example, when the predetermined communication event count is five times, in FIG. 10, each of the virtual servers SV1 and SV2, and virtual servers SV2 and SV3, are regarded as performing business processing of the same type as one another performed in a communication chain. The virtual servers SV1, SV2, SV3 are therefore set to a configuration group X. Each of the virtual servers SV4 and SV5, and the virtual servers SV5 and SV6 are also regarded as engaging in a communication chain with one another and performing business processing of the same type as one another. The virtual servers SV4, SV5, SV6 are therefore set to a configuration group Y. The physical servers BV on which each of the virtual servers SV operate can be acquired by referencing the virtual server management table 66.

Next, at steps 146 to 150 the CPU 48 of the management device 46 derives the information indicating similarity groups between virtual servers. First, at step 146 the CPU 48 of the management device 46 references the inter-server distance table TB4 (FIG. 11), and determines whether or not there is a virtual server pair for which the Euclidean distance is below a predetermined threshold value. Namely, for one of the virtual servers SV, determination is made as to whether or not there is another virtual server SV present from which the Euclidean distance is below the predetermined threshold value (for example, 5). The CPU 48 transitions processing to step 150 when no virtual servers SV have a Euclidean distance below the threshold value (when negative determination is made at step 146). When there is a virtual server SV having a Euclidean distance below the threshold value (when positive determination is made at step 146), at step 148, the CPU 48 updates the similarity group table TB2 (see FIG. 9) to reflect the similarity between the subject virtual servers SV.

At step 150, the CPU 48 determines whether or not there is a remaining virtual server SV in the inter-server distance table TB4, and when a virtual server SV remains (when positive determination is made), returns processing to step 146, and executes the determination of step 146 for the remaining virtual server SV. Processing proceeds to step 152 when determination processing of step 146 has been completed for all of the virtual servers SV in the inter-server distance table TB4 (when negative determination is made at step 150).

Explanation follows regarding an example of derivation of the information indicating inter-virtual server similarity groups at steps 146 to 150. In the configuration group table TB1-1 derived at step 144, the virtual servers SV1, SV2, SV3 are configuration group X, and the virtual servers SV4, SV5, SV6 are configuration group Y. When the virtual server SV1 is made the subject, information is set indicating the similarity group of the virtual server SV1. Namely, the information indicating the similarity group is set to "X-1" since the virtual server SV1 is the first virtual server SV in the configuration group X. Processing transitions to the next virtual server SV since there is no virtual server SV below the threshold value for the virtual server SV1 in the inter-server distance table TB4. As a result, the virtual servers SV1, SV2, SV3 are assigned to similarity groups X-1, X-2, and X-3, and the virtual servers SV4, SV5, SV6 are assigned to similarity groups Y-1, Y-2, and Y-3 (see FIG. 9).

Next, at step 152 the CPU 48 of the management device 46 decides the running configuration of the virtual servers SV, namely, decides the running rules. The CPU 48 operates as the decision section 20 included in the running rule construction section 16 of the operation management device 12 of FIG. 1 by executing step 152 of the running rule construction process 58. Namely, the operation management device 12 is implemented by the management device 46, and the management device 46 operates as the decision section 20 included in the running rule construction section 16 of the operation management device 12 due to execution of step 152 of the running rule construction process 58.

At step 152, first, as first processing, the CPU 48 of the management device 46 acquires the location of the physical servers BV on which the virtual servers SV of each configuration group operate. More specifically, for each configuration group included in the configuration group table TB1, the CPU 48 acquires the location of the physical servers BV on which each of the virtual servers included in a subject configuration group operate, from the virtual server management table 66. Second processing is determination as to whether each configuration group is "for concentration-type running" or "for distributed-type running" More specifically, for each configuration group included in the configuration group table TB1, the CPU 48 determines "for concentration-type running" when all of the virtual servers SV included in the subject configuration group operate on a single one of the physical servers BY. Otherwise, namely, when the virtual servers SV included in the subject configuration group are operating on different physical servers BV, the CPU 48 determines "for distributed-type running" The CPU 48 updates the determination result in the configuration group table TB1 with the determination results.

FIG. 16 illustrates an example of configuration group table TB1-2 decided at step 152 of the running rule construction process 58.

In the processing of step 134, the information indicating the port numbers employed by the virtual servers SV in communications is acquired. The CPU 48 of the management device 46 can identify the type of the virtual server SV (in the present exemplary embodiment, web server, application server, or database server) from the information indicating the port employed by the virtual server SV in communications. The CPU 48 may add to the configuration group table TB1, the type of the virtual server SV identified from the information indicating the port number employed by the virtual server SV in communications (see FIG. 8). In FIG. 8, web servers are denoted (WEB), application servers are denoted (APP), and database servers are denoted (DB).

Next, explanation follows regarding the migration processing of the virtual servers SV. When performing business processing that employs plural virtual servers SV with dependency relationships between computers, there are times when a predetermined device automatically adds a new virtual server SV because of an increase in the processing load of the business processing or the like (known as scaling out). The location of the physical server BV of an automatically added virtual server SV is generally established based on operating states such as the resources of the computer system 44. The location of the physical server BV on which the automatically added virtual server SV operates is therefore freely selected, and does not reflect the running rules of the operating locations of plural virtual servers SV with dependency relationships, deliberately defined by the user when the system was constructed, for performing business processing. Thus, in the present exemplary embodiment, processing is executed to migrate the virtual server SV such that the location of the physical server BV on which the automatically added virtual server SV operates matches the running rules based on the user choices. The processing to migrate the virtual server SV is performed by executing the virtual server migration process 60 included in the management program 54 executed by the management device 46.

Figure 17:
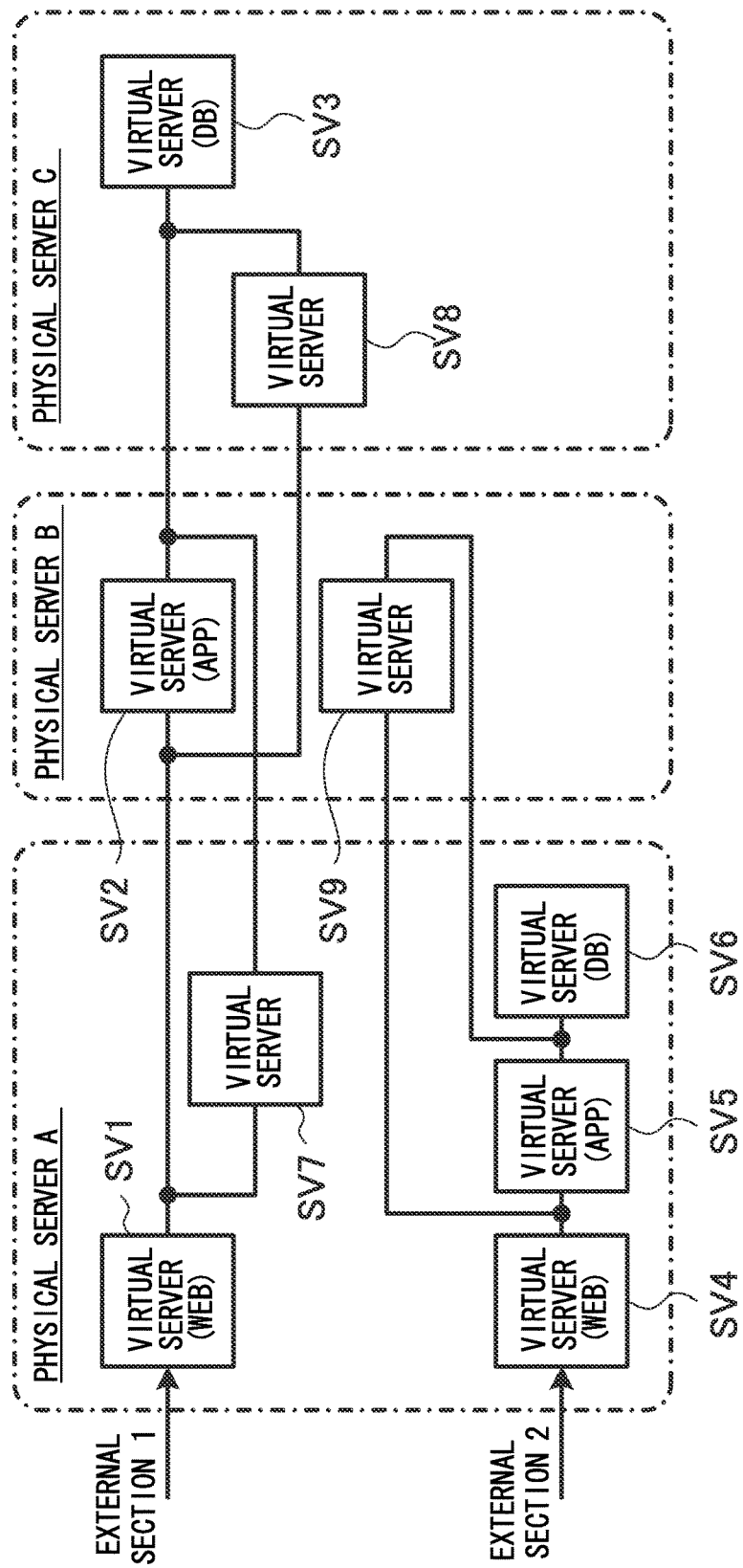
FIG. 17 is an illustrative diagram illustrating an example of an automatically added virtual server.

FIG. 17 illustrates an example of an automatically added virtual server SV. FIG. 17 illustrates a relationship in which the virtual servers SV7, SV8, and SV9 are automatically added to the physical servers A, B, C and the virtual servers SV1 to SV6. As an example of so-called scaling out, FIG. 17 illustrates a case in which the virtual servers SV7, SV8, scaled out for the virtual server SV2 operating on the physical server B, are automatically added to the physical servers A, C. As another example, FIG. 17 illustrates a case in which the virtual server SV9, scaled out for the virtual server SV5 operating on the physical server A, is automatically added to the physical server B.

Figure 18:
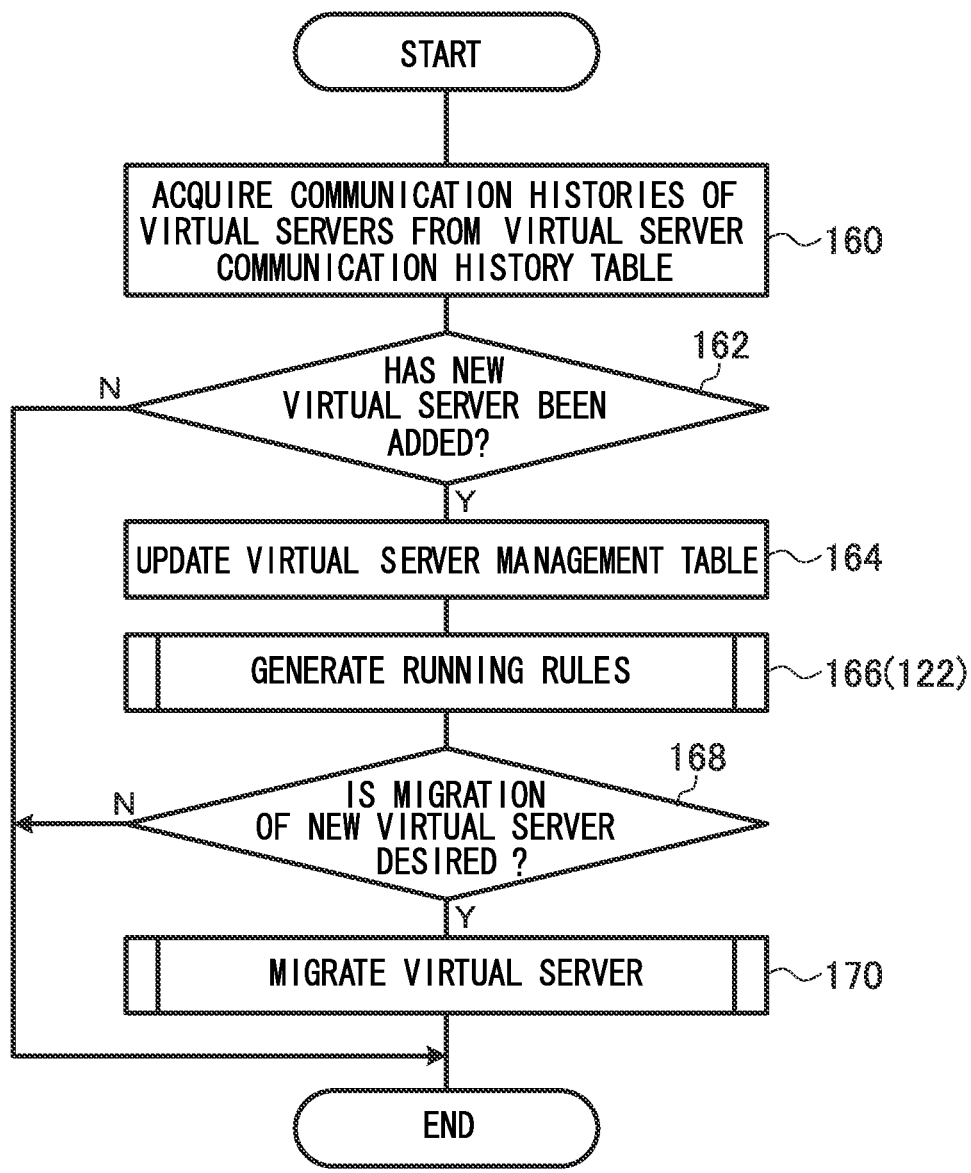
FIG. 18 is a flowchart illustrating a flow of virtual server migration processing.

FIG. 18 illustrates a flow of the virtual server migration process 60 included in the management program 54 executed by the management device 46. The management device 46 operates as the node migration section 24 of the operation management device 12 (FIG. 1) due to execution of the virtual server migration process 60 by the management device 46, and executes migration processing of the virtual servers SV on the physical servers BY. The processing routine illustrated in FIG. 18 is repeatedly executed at specific time intervals during operation of the management device 46. The processing routine illustrated in FIG. 18 is not limited to repeated execution, and may be configured to execute according to operation instructions by a user from input devices such as the keyboard 76 and the mouse 77.

At step 160, the CPU 48 of the management device 46 acquires information related to communication histories of the virtual servers SV from the virtual server communication history table 70 stored in the database 64, and at the next step 162, determines whether or not a new virtual server SV has been added. Determination as to whether or not a virtual server SV has been newly added can be made by determining whether or not the information indicating the transmission origin IPs or the reception destination IPs registered in the virtual server communication history table 70 is present in the IP address information of the virtual server management table 66. When a virtual server SV has not been newly added (when negative determination is made at step 162), the CPU 48 ends the current processing routine in the current state. When a virtual server SV has been newly added (when affirmative determination is made at step 162), the CPU 48 proceeds to step 164.

At step 164, the CPU 48 of the management device 46 executes update processing that adds the information of the new virtual server SV acquired at step 160 to the virtual server management table 66. Next, similarly to at step 122 illustrated in FIG. 13, at step 166 the CPU 48 transitions processing to step 168 after constructing the running rules.

Namely, the CPU 48 of the management device 46 acquires information related to the physical servers BV and information related to the virtual servers SV, and identifies the locations of the virtual servers SV on the physical servers BV (steps 130 to 132 illustrated in FIG. 14). Next, the CPU 48 of the management device 46 acquires information indicating the communication histories of the virtual servers SV from the virtual server communication history table 70, and updates the inter-server communication event count table TB3 (steps 134 to 136 illustrated in FIG. 14).

FIG. 19 illustrates the inter-server communication event count table TB3 when a virtual server SV is newly added. The virtual servers SV operating on the physical servers A, B, C are the nine virtual servers SV1 to SV9 (see FIG. 17). The updated inter-server communication event count table TB3 accordingly becomes a table in which the external device 1 and the external device 2 have been added in addition to the nine virtual servers SV1 to SV9.

Next, the CPU 48 of the management device 46 derives the information indicating similarities by deriving the inter-server Euclidean distances, and updates the inter-server distance table TB4 (steps 138 to 142 illustrated in FIG. 14).

FIG. 20 illustrates the inter-server distance table TB4 when the virtual servers SV are newly added. Since the three virtual servers SV7 to SV9 are added, the updated inter-server distance table TB4 becomes a table listing distances between the nine virtual servers SV1 to SV9.

Next, the CPU 48 of the management device 46 derives information indicating the groups representing plural virtual servers SV operating with dependency relationships (step 144 illustrated in FIG. 14). Namely, the CPU 48 of the management device 46 references the inter-server communication event count table TB3, and sets virtual servers SV, for which the communication event count exceeds the predetermined number of times, to a configuration group of virtual servers SV that engage in a communication chain.

FIG. 21 illustrates an example of a configuration group table TB1-1 of derived information indicating groups. Note that the configuration group table TB1 (FIG. 8) is already registered in the running rule management table 72. Comparison between the virtual servers SV in the configuration group table TB1 (FIG. 8) and the configuration group table TB1-1 (FIG. 21) indicates that the virtual servers SV7, SV8, SV9 have been added. The added virtual servers SV7, SV8 are in the configuration group X, and the added virtual server SV9 is in the configuration group Y. As described below, adding the added virtual servers SV7, SV8, SV9 to the existing configuration group table TB1 enables application of the existing running rules.

Next, the CPU 48 of the management device 46 derives the information indicating the inter-virtual server similarity groups (steps 146 to 150 illustrated in FIG. 14). Namely, the CPU 48 references the inter-server distance table TB4 (FIG. 20), and updates the similarity group table TB2 to reflect that there are similarities between virtual servers having Euclidean distances below the threshold value.

FIG. 22 illustrates the similarity group table TB2 including the added virtual servers SV. The similarity group table TB2 (FIG. 9) is already registered in the running rule management table 72. Comparing the virtual servers SV in the similarity group table TB2 illustrated in FIG. 9 and the similarity group table TB2 illustrated in FIG. 22 indicates that the virtual servers SV7, SV8, SV9 have been added. The added virtual servers SV7, SV8 are in the similarity group X-2, and the added virtual server SV9 is in the similarity group Y-3.

Namely, from referencing the inter-server distance table TB4 illustrated in FIG. 20, the information indicating the inter-server distances between the virtual servers SV7, SV9 and the virtual server SV2, namely the Euclidean distances are below the threshold value. The Euclidean distance between the virtual server SV7 and the virtual server SV8 is also below the threshold value. The virtual servers SV7, SV8 are accordingly set to the similarity group X-2 of the virtual server SV2 since the virtual servers SV7, SV8 have high similarity to the virtual server SV2. Moreover, the information indicating the inter-server distance, namely the Euclidean distance, between the virtual server SV9 and the virtual server SV5 is also below the threshold value. The virtual server SV9 is accordingly set to the similarity group Y-2 of the virtual server SV5 since the virtual server SV9 has high similarity to the virtual server SV5.

Next, the CPU 48 of the management device 46 decides the running configuration, namely, the running rules, of the virtual servers SV (step 152 illustrated in FIG. 14).

The configuration group table TB1 is already established for the configuration of the virtual servers SV1 to SV6 (FIG. 8). The CPU 48 of the management device 46 therefore adds the virtual servers SV newly added this time to the corresponding configuration group. Namely, for each configuration group, the CPU 48 adds information indicating the added virtual servers SV, according to the similarity groups corresponding to the added virtual servers SV. The running configuration prior to newly adding (spinning out) the virtual servers SV can accordingly be reflected after the virtual servers SV have been newly added (spun out).

The CPU 48 operates as the addition section 22 included in the running rule construction section 16 of the operation management device 12 of FIG. 1 by executing steps 146 to 150 of the running rule construction process 58. Namely, the operation management device 12 is implemented by the management device 46, and the management device 46 operates as the addition section 22 included in the running rule construction section 16 of the operation management device 12 due to execution of steps 146 to 150 of the running rule construction process 58.

FIG. 23 illustrates a configuration group table TB1 including the added virtual servers SV. When information indicating the added virtual servers SV is added to the configuration group table TB1 according to the similarity groups corresponding to the added virtual servers SV, the operating locations of the added virtual servers SV are sometimes different in reality.

FIG. 24 illustrates the similarity group table TB2 corresponding to the configuration group table TB1 illustrated in FIG. 23. Comparing FIG. 22 with FIG. 24 reveals a discrepancy in the locations of the physical servers BV on which the virtual servers SV7 to SV9 operate. The discrepancy in the locations of the physical servers BV is caused by information of the added virtual servers SV having been added to the configuration group table TB1 according to the similarity groups. The operating locations of the added virtual servers SV7 to SV9 are therefore preferably migrated to physical server BV locations according to the running rules.

When processing of step 166 illustrated in FIG. 18 is completed, at step 168 the CPU 48 of the management device 46 determines whether or not migration is desired for the newly added virtual server SV. Determination as to whether or not migration is desired for the virtual server SV for which migration is desired can be made by comparing the location of the newly added virtual server SV indicated by the configuration group table TB1 with the location indicated by the similarity group table TB2 illustrated in FIG. 22, and determining whether or not there is a discrepancy. When the location of the physical server BV on which the newly added virtual server SV operates matches the configuration group table TB1 (when negative determination is made at step 168), the current processing routine ends in the current state since migration of the virtual server SV is not desired. When the operating location of the newly added virtual server SV does not match the configuration group table TB1 (when affirmative determination is made at step 168), the current processing routine ends after migration processing has been performed for the virtual server SV at step 170, since migration of the virtual server SV is desired.

Figure 25:
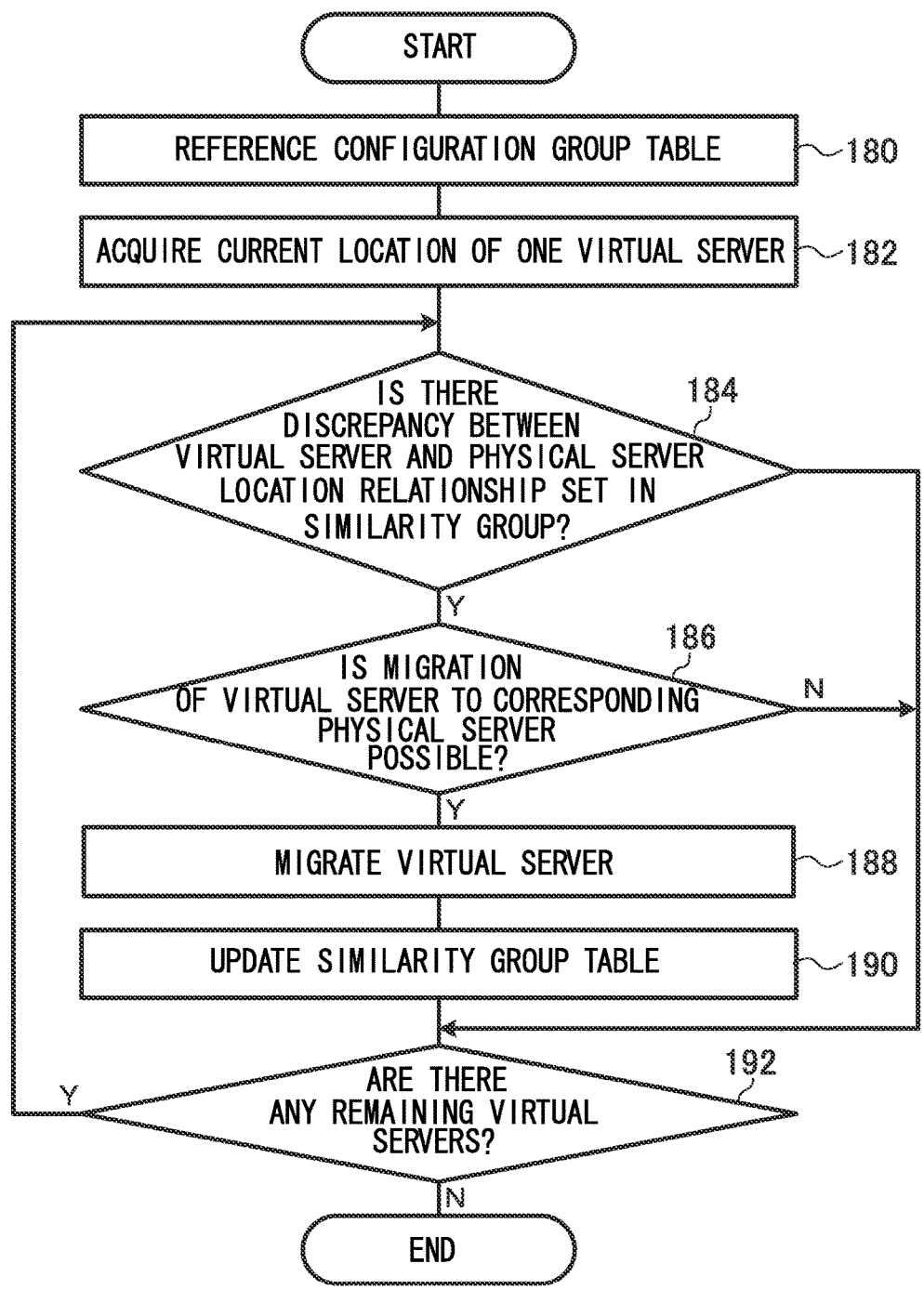
FIG. 25 is a flowchart illustrating a flow of virtual server migration processing included in a virtual server migration process.

FIG. 25 illustrates a flow of virtual server migration processing included in the virtual server migration process 60 executed by the management device 46.

At step 180, the CPU 48 of the management device 46 acquires information of the configuration group table TB1 established using the processing illustrated in FIG. 18, and at the next step 182, acquires the current location of one of the virtual servers SV included in the configuration group table TB1. At the next step 184, the CPU 48 determines whether or not there is a discrepancy between the location of the physical server BV as set in the similarity group table TB2, and the current location. Namely, determination is made as to whether or not there is a discrepancy between the location of the physical server BV on which the virtual server SV acquired at step 182 operates, and the location of the physical server BV registered in the configuration group table TB1. When the location of the physical server BV matches and negative determination is made at step 184, the CPU 48 transitions processing to step 192, and when the location of the physical server BV does not match and affirmative determination is made, the CPU 48 proceeds to step 186.

At step 186, the CPU 48 determines whether or not migration of the subject virtual server SV to the location of the physical server BV registered in the configuration group table TB1 is possible. The determination processing of step 186 can be made by determining whether or not the resources for operation of the subject virtual server are smaller (less than) the resources of the migration destination physical server BV. When operation of the subject virtual server SV on the migration destination physical server BV is possible, the CPU 48 makes step 186 an affirmative determination and proceeds to step 188, and when operation is not possible, the CPU 48 makes step 186 a negative determination and proceeds to step 192.

At step 188, the CPU 48 causes the subject virtual server SV to migrate to the physical server BV location registered in the configuration group table TB1, and at the next step 190, updates the similarity group table TB2.

At step 192, the CPU 48 determines whether or not there is a virtual server SV remaining in the configuration group table TB1. When there is a virtual server SV remaining, the CPU 48 makes a negative determination at step 192 and returns processing to step 184, and executes the migration processing on a remaining virtual server SV. When the processing has been completed for all of the virtual servers SV, the CPU 48 makes negative determination at step 192, and the current processing routine ends.

Figure 26:
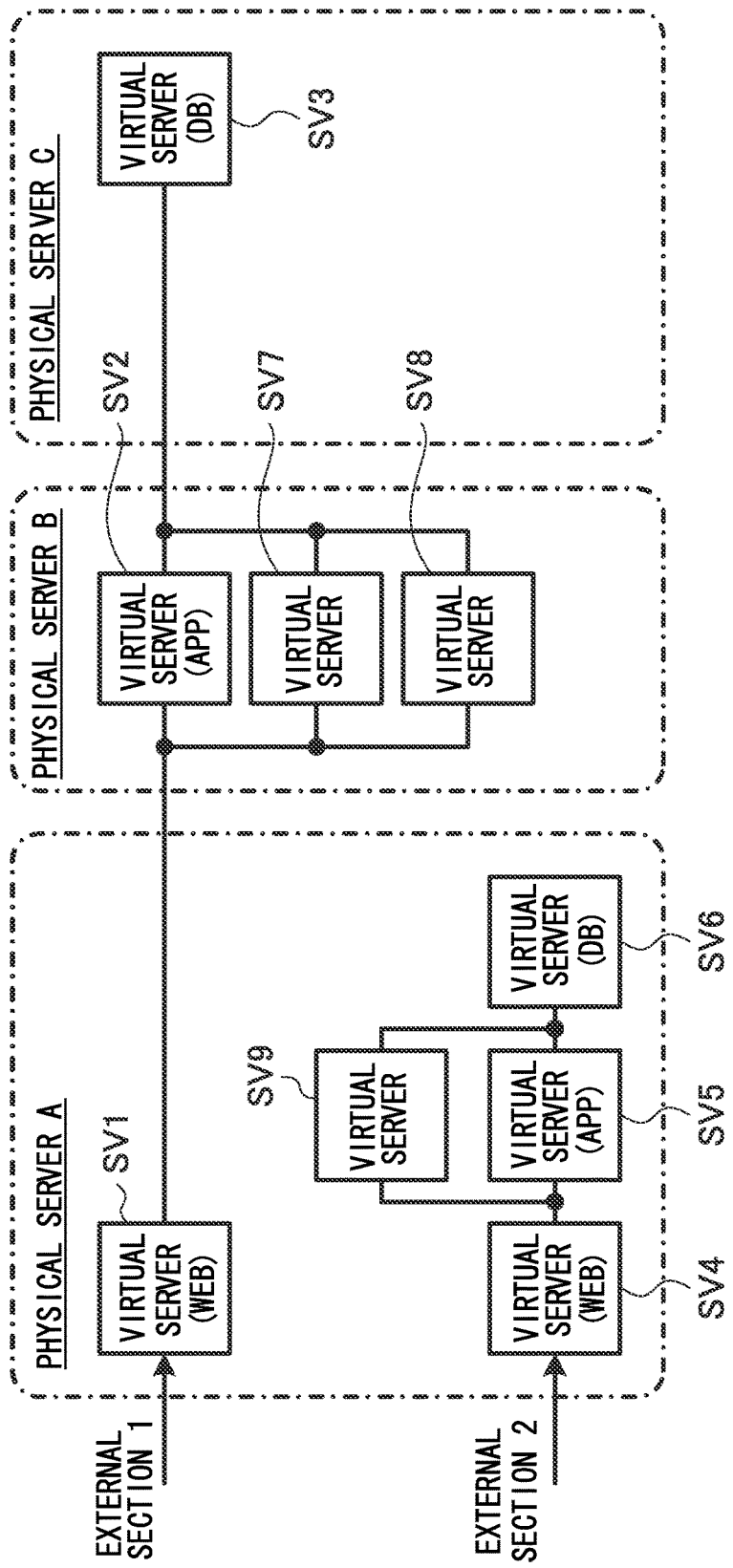
FIG. 26 is an illustrative diagram illustrating a configuration after a virtual server has been migrated by a virtual server migration process.

FIG. 26 illustrates a configuration after the virtual servers SV have been migrated by the virtual server migration process 60 executed by the management device 46. As illustrated in FIG. 26, it is apparent that the placement of the virtual servers SV becomes consistent with the configuration group table TB1 illustrated in FIG. 23.

In the present exemplary embodiment, although an example is demonstrated in which the similarity groups are found and associated with the virtual servers SV in the running rule construction process 58 included in the management program 54, technology disclosed herein is not limited to employing the similarity groups. For example, closeness groups between the similarity groups may be generated, and the closeness groups may be employed. For example, sums of periodic network communication volumes between similarity groups may be compared, and groups having a higher sum of network communications set with a relationship of high closeness. Virtual servers SV having a high closeness relationship with each other preferably have a concentrated configuration, namely, they preferably operate on a single physical server BV. For example, when a portion of the virtual servers SV of a group running with a concentration configuration are distributed to other physical servers BV due to resources of a physical server BV being insufficient or the like, the virtual servers SV having a relationship of high closeness are formed into a closeness group and migrated as a closeness group unit. Efficient operation of the virtual servers SV while reflecting the user's choices is thereby enabled by employing a concentration configuration.

In the present exemplary embodiment, although explanation has been given of an example in which known virtual servers SV are added for so-called scaling out, technology disclosed herein is not limited to addition of known virtual servers SV in so-called scaling out. For example, simple application may also be made for addition of virtual servers SV when new business processing is added.

Figure 27:
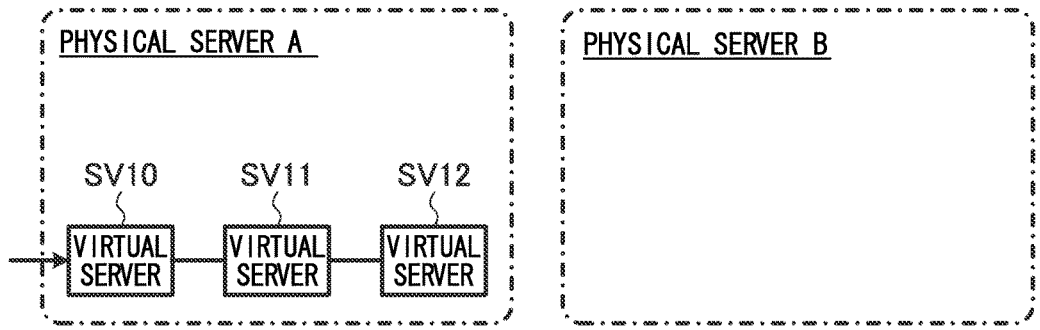
FIG. 27 is an illustrative diagram illustrating an example of relationships between physical servers and virtual servers with dependency relationships.

As an example of plural computers with dependency relationships, FIG. 27 illustrates a relationship between physical servers BV and virtual servers SV functioning on the two computers 32, 36 of the computer system 44 managed by the management device 46. A case is illustrated in which the computer 32 functions as the physical server A, and three virtual servers SV10, SV11, SV12 are constructed using concentration configurations. Moreover, in the case illustrated, the computer 36 functions as the physical server B, and no virtual servers SV are constructed thereon.

Figure 28:
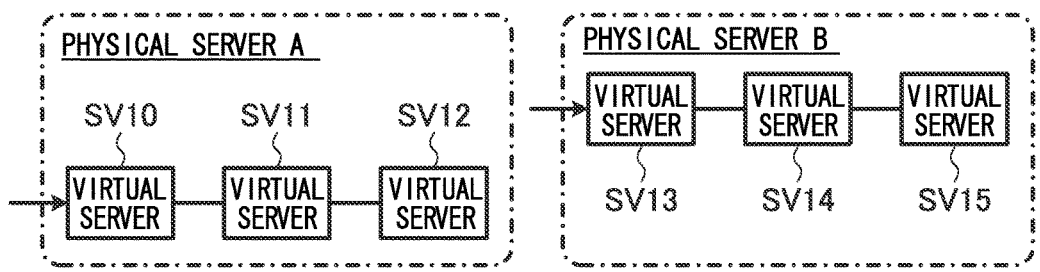
FIG. 28 is an explanatory diagram of when virtual servers are newly constructed on a physical server using a concentration configuration for new business processing.

FIG. 28 illustrates a case in which three virtual servers SV13, SV14, SV15 with a concentration configuration are newly constructed on the physical server B in the computer system 44 illustrated in FIG. 27, in order to perform new business processing. The virtual servers SV13, SV14, SV15 newly constructed on the physical server B illustrated in FIG. 28 may generate the running rules using processing according to the running rule construction process 58 illustrated in FIG. 14.

Figure 29:
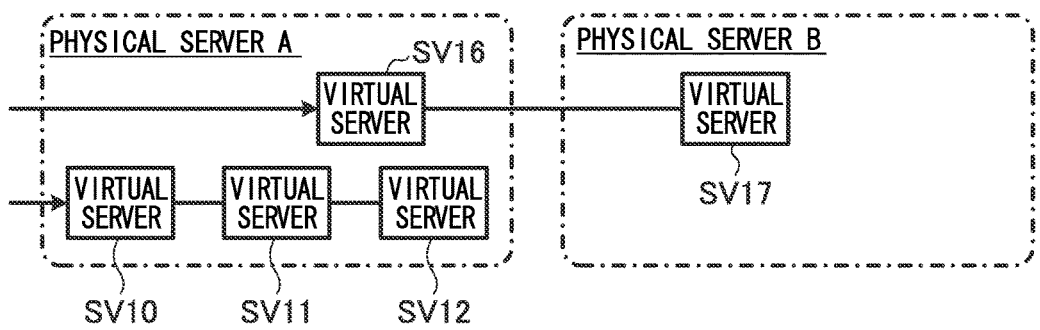
FIG. 29 is an explanatory diagram of when virtual servers are newly constructed on a physical server using a distributed configuration for new business processing.

FIG. 29 illustrates a case in which two virtual servers SV16, SV17 with a distribution configuration are newly constructed distributed between the physical server A, and the physical server B on the computer system 44 illustrated in FIG. 27, in order to perform new business processing. The virtual servers SV16, SV17 newly constructed distributed between the physical servers A, B illustrated in FIG. 29 may also generate the running rules using processing according to the running rule construction process 58 illustrated in FIG. 14.

As explained above, according to the present exemplary embodiment, automatic discovery and generation of the running rules when a system starts operation is enabled. Automatic generation of running rules for newly added virtual servers SV is also enabled. Generation of the running rules for virtual servers SV, added due to scaling out of existing business or adding new business, according to the operation states of the virtual servers SV is accordingly enabled. Re-placement of the virtual servers SV according to the generated running rules is also enabled. Continuation without business processing being stopped, by a user's manual operation or the like, is accordingly enabled, even when virtual servers SV are automatically generated according to changes in business load in environments in which many businesses co-exist such as a data center. Automation of management of business processing is accordingly enabled.

In computer systems that perform business processing using computers, business processing is needs to be continued without stopping operation of the computers. However, swift migration of the virtual servers SV executing on the subject physical server BV needs to be made for physical servers BV in critical states, such as when an abnormality arises on the physical server BV due to insufficient resources, hardware resource failure, or the like.

In order to swiftly migrate the virtual servers SV executing on the physical server BV in a critical state, migration needs to be performed after ascertaining the operating states of the virtual servers SV executing on the physical server BV in a critical state, namely, the running rules. In the present exemplary embodiment, since automatic generation of the running rules for the virtual servers SV operating on a physical server BV is enabled, swift migration of the physical servers SV executing on the physical server BV in a critical state is enabled. Namely, processing that causes swift migration of virtual servers SV executing on the physical server BV in a critical state may be added to the virtual server migration process 60.

Figure 30:
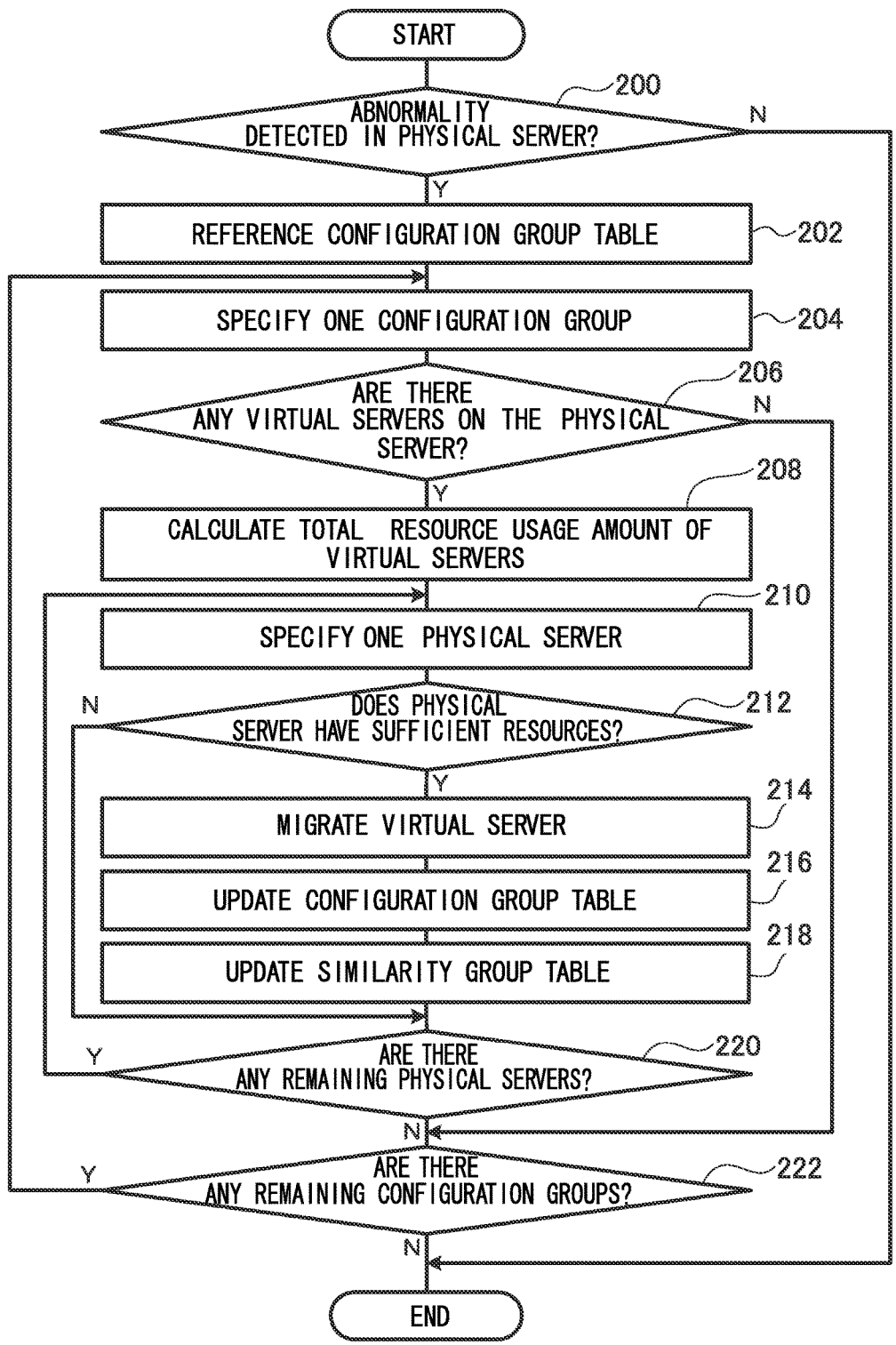
FIG. 30 is a flowchart illustrating a flow of a virtual server migration process during a critical state.

FIG. 30 illustrates a flow of the virtual server migration process 60 during a critical state. The virtual server migration process 60 illustrated in FIG. 30 may be added to the virtual server migration process 60 included in the management program 54. Note that the virtual server migration process 60 illustrated in FIG. 30 is repeatedly executed at specific time intervals during operation of the management device 46. The processing routine illustrated in FIG. 18 is not limited to repeated execution, and may be configured to execute according to operation instructions by a user from input devices such as the keyboard 76 and the mouse 77.

At step 200, the CPU 48 of the management device 46 determines whether or not an abnormality has been detected in the physical servers BY. When no abnormalities have been detected in the physical servers BV, negative determination is made at step 200, and the CPU 48 ends the current processing routine in the current state. When an abnormality is detected in a physical server BV, an affirmative determination is made at step 200, and the CPU 48 proceeds to step 202, references the configuration group table TB 1 of the running rule management table 72 stored in the database 64, and proceeds to step 204.

Next, at step 204 the CPU 48 specifies one of the configuration groups included in the configuration group table TB1, and proceeds to step 206. At step 206, the CPU 48 determines whether or not there are any virtual servers SV in the configuration group specified at step 204, operating on the physical server BV detected at step 200. When negative determination is made at step 206, the CPU 48 proceeds to step 222. When affirmative determination is made at step 206, the CPU 48 proceeds to step 208, and computes the total resource usage amounts of the virtual servers SV.

Next, at step 210 the CPU 48 specifies one of the physical servers BV, and at the next step 212, determines whether or not or not the subject physical server BV meets the total value of the resource usage amounts of the virtual servers SV found at step 208. When negative determination is made at step 212, the CPU 48 proceeds to step 220, and when affirmative determination is made, the CPU 48 proceeds to step 214. At step 214, the CPU 48 causes migration of the virtual servers SV to the physical server BV specified at step 210. Next, at step 216 the CPU 48 updates the configuration group table TB1, and updates the similarity group table TB2 at the next step 218.

Next, at step 220 the CPU 48 determines whether or not there are any remaining physical servers BV, and proceeds to step 222 when negative determination is made, and returns processing to step 210 when affirmative determination is made. Next, at step 222 the CPU 48 determines whether or not there are any remaining configuration groups, and ends the current processing routine when negative determination is made, and returns processing to step 204 when affirmative determination is made.

In the example of processing illustrated in FIG. 30, the running rule of the configuration group is a concentration configuration. When the running rule of the configuration group is a concentration configuration, first, a total resource usage amount is computed for the single, or plural virtual servers SV in the configuration group. Then, a physical server BV on which operation is possible is identified from out of migration candidate physical servers BV, and the virtual servers SV are migrated. When determination is made that none of the migration candidate physical servers BV have sufficient resources to allow execution of the virtual servers SV of the configuration group on a single physical server BV, migration may employ a closeness group. Namely, similarity groups having high closeness within the configuration group may be reconfigured into a sub-group, and migration may be performed by distributing across plural physical servers BY.

In another example of processing illustrated in FIG. 30, the running rule of the configuration group is a distribution configuration. When the running rule of the configuration group is a distribution configuration, first, a total resource usage amount is computed for the virtual servers SV within the configuration group in the similarity groups that are executing on the physical server BV in which an abnormality was detected. Next, a migration destination physical server BV, other than the physical servers BV on which the other similarity groups of the configuration group are executing, is identified, and migration performed.

Figure 31:
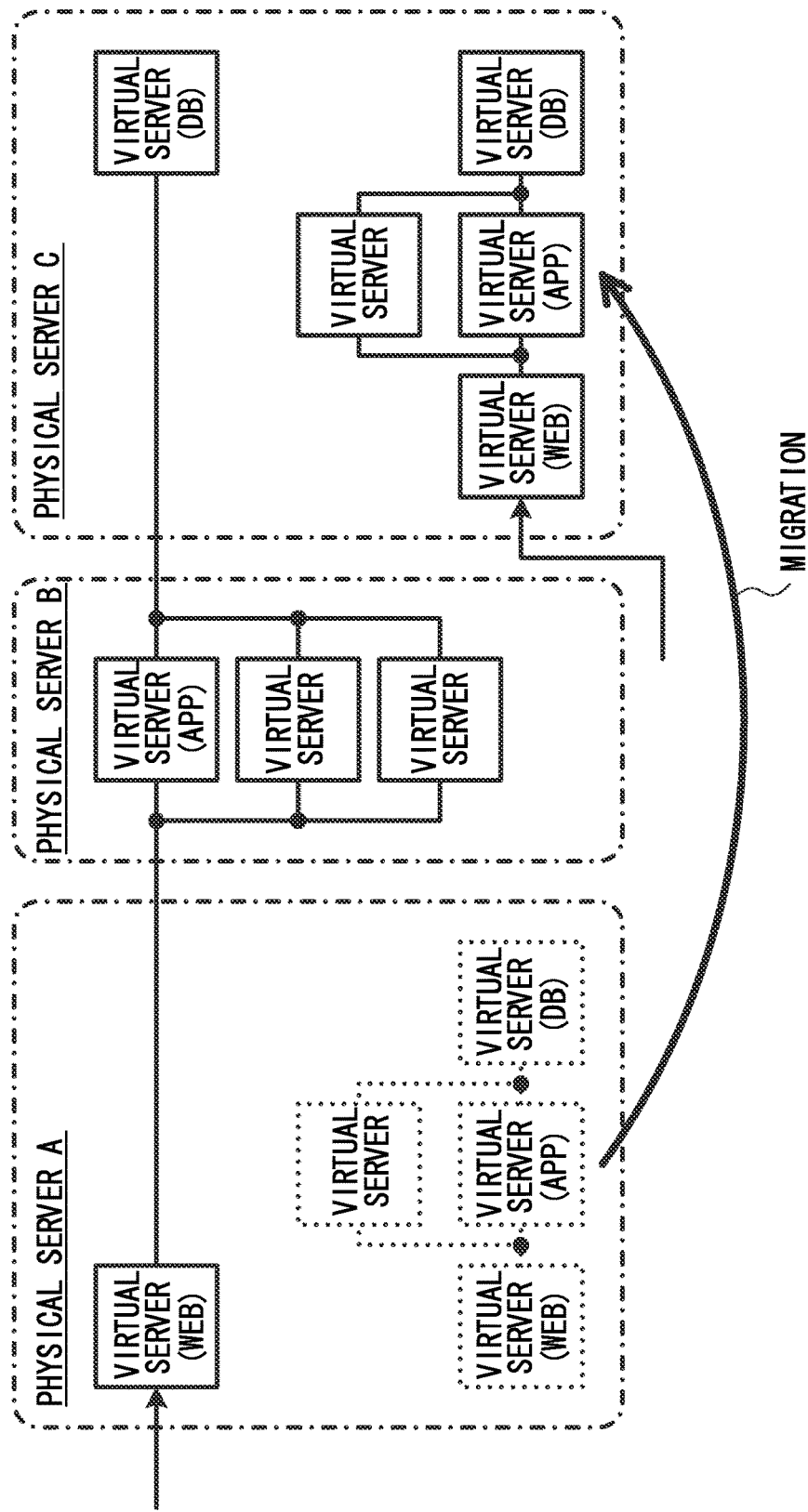
FIG. 31 is an illustrative diagram illustrating a configuration after virtual servers are migrated using running rules of a concentration configuration.

FIG. 31 illustrates a configuration after the virtual servers SV have been migrated by the virtual server migration process 60, in a case in which the running rule of the configuration group is a concentration configuration. As illustrated in FIG. 31, it is apparent that the virtual servers SV are migrated according to the configuration group table TB1.

As explained above, migration according to the running rules is enabled for virtual servers SV executing on a physical server in a critical state making business processing on the physical server problematic. Performance is enabled of migration of the virtual servers SV after ascertaining the operating states of the virtual servers SV executing on the physical server in a critical state, namely, the running rules, without stopping business processing.

Although explanation has been given of an example of a server functioning as a virtual server SV included on a physical server, there is no limitation to a server functioning as a virtual server SV. For example, application may be made to any computer including a physical server or a virtual server SV.

Although explanation has been given of an example in which the system uses a three tier system model, there is no limitation to systems that use a three tier system model, and obviously various improvements and modifications may be implemented within a range not departing from the spirit of technology disclosed herein.

Although explanation has been given of an example in which groups include plural virtual servers SV, there is not limitation to groups including virtual servers SV alone. For example, a physical server may be included.

Moreover, although explanation has been given above of cases in which the programs described are pre-stored (installed) in a storage section of a computer, it is possible to provide the programs in a format recorded on a recording medium such as a CD-ROM or a DVD.

Sometimes the user deliberately decides on the operating locations of the plural virtual computers when constructing a data processing system that performs business processing using plural computers including virtual computers with dependency relationships. Examples thereof include cases in which a choice is made to perform business processing with plural virtual computers operating on one physical computer, and cases in which a choice is made to perform business processing with plural virtual computers operating distributed between separate physical computers.

However, group information indicating plural virtual computers, and information indicating operating locations of virtual computers, are defined and modified according to a user's manual operations. Therefore, when a virtual computer is newly added, or automatically relocated, there are cases in which it is not possible to operate virtual computers at locations chosen by the user until the completion of setting modification by manual operation by the user.

An aspect of technology disclosed herein enables reduction of manual operations by a user related to operation management of plural computers with dependency relationships.

All publications, patent applications, and technical standards mentioned in the present specification are incorporated by reference in the present specification to the same extent as if the individual publication, patent application, or technical standard was specifically and individually indicated to be incorporated by reference.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An operation management device, comprising:
   a processor that executes a process, the process comprising:
   for a plurality of nodes that includes a plurality of nodes operating as virtual computers on one or more physical computers and that a plurality of nodes that have a dependency relationship and that perform mutual inter-node communication during operation, calculating a degree of similarity between the plurality of nodes on a basis of communication information from when the inter-node communication is performed and deriving a virtual group that includes a subset of the plurality of nodes between whom the calculated degree of similarly exceeds a specific threshold, the communication information including physical location information of the plurality of nodes, which indicates one or more physical computers on which the respective ones of the plurality of nodes operate;
   based on the physical location information for each of the plurality of nodes included in the derived virtual group, determining operation information indicating that a plurality of nodes included in the virtual group operate on a single physical computer, or operation information indicating that the plurality of nodes included in the virtual group respectively operate on a plurality of physical computers; and
   based on the determined operation information, if a first physical computer, on which a first node included in the virtual group, operate, is different from a second physical computer, on which a second node included in the virtual group and having a degree of similarity to the first node that exceeds the predetermined threshold, operate, moving the first node from the first physical computer to the second physical computer.

2. The operation management device of claim 1, wherein, the communication information between a plurality nodes includes a communication event count of mutual communication performed between the plurality of nodes.

3. The operation management device of claim 1, wherein, the operation information indicates whether or not a subset of nodes included in the virtual group operates on a different physical computer from nodes included in the virtual group other than the subset of nodes.

4. The operation management device of claim 1, the process further comprising:
   adding a node to the virtual group that includes nodes whose degree of similarity to the added node exceeds the specific threshold.

5. The operation management device of claim 4, wherein, as the degree of similarity, a Euclidean distance is found between the added node and one node out of the plurality of nodes.

6. The operation management device of claim 1, further comprising a storage section that stores a virtual group information and the operation information as a table, the virtual group information indicating which subset of the plurality of nodes form a common virtual group.

7. The operation management device of claim 4, the process further comprising:
   based on the virtual group of the added node and the operation information of the added node, when a physical computer on which the added note operates does not match a physical computer on which a node exhibiting a degree of similarity of the specific value or greater operates, moving the added node to the physical computer on which the node exhibiting a degree of similarity of the specific value or greater operates.

8. The operation management device of claim 1, the process further comprising:
   when a physical computer including at least one node is in a critical state that is problematic for operation, moving a node that operates on the critical state computer to a physical computer that is different from the critical state computer and that is associated with the operation information of the virtual group including the node.

9. An operation management method, comprising:

for a plurality of nodes that includes a plurality of nodes operating as virtual computers on one or more physical computers and that includes a plurality of nodes that have a dependency relationship and that perform mutual inter-node communication during operation, calculating a degree of similarity between the plurality of nodes on a basis of communication information from when the inter-node communication is performed and deriving a virtual group that includes a subset of the plurality of nodes between whom the calculated degree of similarly exceeds a specific threshold, the communication information including physical location information of the plurality of nodes, which indicates one or more physical computers on which the respective ones of the plurality of nodes operate;

by a processor, based on the physical location information for each of the plurality of nodes included in the derived virtual group, determining operation information indicating that a plurality of nodes included in the virtual group operate on a single physical computer, or operation information indicating that the plurality of nodes included in the virtual group respectively operate on a plurality of computers; and based on the determined operation information, if a first physical computer, on which a first node included in the virtual group, operate, is different from a second physical computer, on which a second node included in the virtual group and having a degree of similarity to the first node that exceeds the predetermined threshold, operate, moving the first node from the first physical computer to the second physical computer.

10. The operation management method of claim 9, wherein, communication information between a plurality of nodes includes a communication event count of mutual communication performed between the plurality of nodes.

11. The operation management method of claim 9, wherein, the operation information indicates whether or not a subset of nodes included in the virtual group operates on a different physical computer from nodes included in the virtual group other than the subset of nodes.

12. The operation management method of claim 9, further comprising:

adding a node to the virtual group that includes nodes whose degree of similarity to the added node exceeds the specific threshold.

13. The operation management method of claim 12, wherein as the degree of similarity, a Euclidean distance is found between the added node and one node out of the plurality of nodes.

14. The operation management method of claim 9, further comprising storing, via a storage section, a virtual group information and the operation information as a table, the virtual group information indicating which subset of the plurality of nodes form a common virtual group.

15. The operation management method of claim 12, further comprising:

based on the virtual group of the added node and the operation information of the added node, when a physical computer on which the added node operates does not match a physical computer on which a node exhibiting a degree of similarity of the specific value or greater operates, moving the added node to the physical computer on which the node exhibiting a degree of similarity of the specific value or greater operates.

16. The operation management method of claim 9, further comprising:

when a physical computer including at least one node is in a critical state that is problematic for operation, moving a node that operates on the critical state computer to a physical computer that is different from the critical state computer and that is associated with the operation information of the virtual group including the node.

17. A non-transitory recording medium storing an operation management program that causes a computer to execute a process, the process comprising:

for a plurality of nodes that includes a plurality of nodes operating as virtual computers on one or more physical computers and that includes a plurality of nodes that have a dependency relationship and that perform mutual inter-node communication during operation, calculating a degree of similarity between the plurality of nodes on a basis of communication information from when the inter-node communication is performed and deriving a virtual group that includes a subset of the plurality of nodes between whom the calculated degree of similarly exceeds a specific threshold, the communication information including physical location information of the plurality of nodes, which indicates one or more physical computers on which the respective ones of the plurality of nodes operate;

based on the physical location information for each of the plurality of nodes included in the derived virtual group, determining operation information indicating that a plurality of nodes included in the virtual group operate on a single physical computer, or operation information indicating that the plurality of nodes included in the virtual group respectively operate on a plurality of physical computers; and based on the determined operation information, if a first physical computer, on which a first node included in the virtual group, operate, is different from a second physical computer, on which a second node included in the virtual group and having a degree of similarity to the first node that exceeds the predetermined threshold, operate, moving the first node from the first physical computer to the second physical computer.

* * * * *